United States Patent
Zourzouvillys

(10) Patent No.: US 10,244,038 B2
(45) Date of Patent: Mar. 26, 2019

(54) COORDINATIVE DATACENTER PROCESSING IN A NETWORK-BASED COMMUNICATION SYSTEM

(71) Applicant: Jive Communications, Inc., Orem, UT (US)

(72) Inventor: Theo Peter Zourzouvillys, Orem, UT (US)

(73) Assignee: JIVE COMMUNICATIONS, INC., Orem, UT (US)

( * ) Notice: Subject to any disclaimer, the term of this patent is extended or adjusted under 35 U.S.C. 154(b) by 728 days.

(21) Appl. No.: 14/531,775

(22) Filed: Nov. 3, 2014

(65) Prior Publication Data
US 2016/0127235 A1  May 5, 2016

(51) Int. Cl.
*G06F 15/16* (2006.01)
*H04L 29/08* (2006.01)

(52) U.S. Cl.
CPC ............ *H04L 67/10* (2013.01); *H04L 67/327* (2013.01); *H04L 67/22* (2013.01)

(58) Field of Classification Search
CPC ....... H04L 67/10; H04L 45/745; H04L 67/22; H04L 67/327
See application file for complete search history.

(56) References Cited

U.S. PATENT DOCUMENTS

| 6,446,949 | B2* | 9/2002 | Schmid | B23K 26/0823 269/21 |
| 6,553,423 | B1* | 4/2003 | Chen | H04L 45/02 370/401 |
| 2002/0083030 | A1* | 6/2002 | Yang | G06F 17/30575 |
| 2006/0109976 | A1 | 5/2006 | Sundaram et al. | |
| 2007/0156842 | A1* | 7/2007 | Vermeulen | G06F 17/30212 709/217 |
| 2008/0319823 | A1 | 12/2008 | Ahn et al. | |
| 2009/0138525 | A1* | 5/2009 | Mattox, Jr. | G06F 17/30575 |
| 2010/0235431 | A1* | 9/2010 | Poluri | G06F 11/2066 709/203 |

(Continued)

FOREIGN PATENT DOCUMENTS

WO   WO 2016/073027   5/2016

OTHER PUBLICATIONS

International Search Report & Written Opinion issued in PCT/US2015/023164 dated Jul. 16, 2015.

*Primary Examiner* — Ario Etienne
*Assistant Examiner* — Kidest Mendaye
(74) *Attorney, Agent, or Firm* — Keller Jolley Preece

(57) ABSTRACT

The present application details exemplary methods and systems for providing current state information to multiple active datacenters within a network-based communication system. For example, a datacenter can detect an event that occurs within the network-based communication system. Upon detecting the event, the datacenter can update a state table on the datacenter based on state information associated with the event. In addition, the datacenter can send a state information message to other datacenters in the network-based communication system. The state information message can include state information associated with the event. The other datacenters in the network-based communication system can update their respective state tables using the state information in the state information message without needing to individually process the event.

20 Claims, 11 Drawing Sheets

(56) References Cited

U.S. PATENT DOCUMENTS

| | | |
|---|---|---|
| 2011/0038633 A1 | 2/2011 | Decusatis et al. |
| 2011/0126220 A1 | 5/2011 | Lerner |
| 2011/0173294 A1* | 7/2011 | Jackson ............ G06F 17/30575 709/217 |
| 2011/0202572 A1* | 8/2011 | Ho ......................... G16H 10/60 707/802 |
| 2013/0185257 A1* | 7/2013 | Puttaswamy Naga ....................... G06F 17/30215 707/634 |
| 2014/0310293 A1* | 10/2014 | Knoll ................ G06F 17/30575 707/756 |

* cited by examiner

| Message 502 | Identifier 504 | Sender 506 | Message Type 508 | Context 510 | Handle 512 | Network Device 514 | Former Value 516 | Updated Value 518 |
|---|---|---|---|---|---|---|---|---|
| 1 | 1DC-1 | 1st Datacenter | Announce | Account-1 | Voicemail | — | — | 1 |
| 2 | 1DC-2 | 2nd Datacenter | Replace | Account-1 | Voicemail | — | 1 | 2 |
| 3 | 1DC-3 | 1st Datacenter | Replace | Account-1 | Voicemail | — | 2 | 1 |
| 4 | 3DC-1 | 3rd Datacenter | Replace | Account-1 | Voicemail | — | 1 | 0 |
| 5 | 1DC-4 | 3rd Datacenter | Replace | Account-3 | Password Change | — | 1234 | 1357 |
| 6 | 1DC-5 | 1st Datacenter | Announce | Account-2 | On Call | Network Device 1 | — | True |
| 7 | 1DC-6 | 1st Datacenter | Withdrawal | Account-2 | On Call | Network Device 1 | True | — |

Fig. 5

COORDINATIVE DATACENTER PROCESSING IN A NETWORK-BASED COMMUNICATION SYSTEM

BACKGROUND

1. Technical Field

One or more embodiments disclosed herein relate generally to facilitating communications over a network. More specifically, one or more embodiments disclosed herein relate to information communication between multiple datacenters within a network-based communication system.

2. Background and Relevant Art

Advances in electronic communications technologies have interconnected people and allowed for better communication than ever before. To illustrate, users traditionally relied on a public switched telephone network ("PSTN") to speak with other users in real-time. With advances in communication technologies, users may communicate using network or Internet-based communication systems. One such network-based communication system is an Internet Protocol ("IP") telephone system, such as a voice over IP ("VoIP") network-based communication system that allows two or more users to communicate.

Conventional network-based communication systems commonly rely on a central datacenter to provide communication services for each network device. For example, the central datacenter can provide VoIP services, such as facilitating network-based communication sessions (e.g., voice and video calls), to one or more network devices. In addition, many conventional network-based communication systems include a backup datacenter that provides an option to restore communication services in the event the central datacenter fails (e.g., network failure, hardware failure, datacenter maintenance).

A number of disadvantages exist with respect to conventional network-based communication systems. For example, due to the need for a backup datacenter, conventional network-based communication systems include a large amount of redundancy, overhead, and inefficiency. In particular, the backup datacenter often must house the same or similar amounts of processing resources as the central datacenter. The resources at the backup datacenter, however, are generally idle for the majority of the time, which leads to a low utilization and inefficiency in the conventional network-based communication system hardware.

The central datacenter/backup datacenter model may also increase the possibility of system failure. For example, disruptions, such as a power failure, may cripple the network-based communication system until the network-based communication system can shift the operations to the backup datacenter. As often is the case, any users that are on a call during the outage will be cut off from the call. Further, after being cut off, the users often must wait for the service provider to shift operations to the backup datacenter before the users can again make calls.

Furthermore, when the central datacenter in a conventional network-based communication system goes down, data is often lost. For example, as described above, unprocessed events often back up at a central datacenter because the central datacenter processes all events that occur within the network-based communication system. If the central datacenter fails with a queue of unprocessed events, the unprocessed event information, such as transaction data, may be lost. As a result, any data that the system migrates from the central datacenter to the backup datacenter is incomplete and out-of-date.

Further, for many conventional network-based communication systems, switching from the central datacenter to a backup datacenter is a complicated process and often requires substantial manual user intervention. For example, conventional network-based communication systems must re-register each network device with the backup datacenter and reestablish current calls via the backup datacenter. Additionally, conventional network-based communication systems often must migrate user settings, call logs, account data, and other information, for each network device from the central datacenter to the backup datacenter.

Accordingly, a number of considerations can be made in improving communicating and maintaining information associated with network-based communication systems.

BRIEF SUMMARY

Embodiments disclosed herein provide benefits and/or solve one or more of the foregoing problems or other problems in the art with systems and methods for providing current state information to multiple datacenters within a network-based communication system. In particular, example embodiments include systems and methods that allow each datacenter in a network-based communication system to provide current state information, located in state tables, to other datacenters within the network-based communication system. Thus, each of the datacenters in a multiple datacenter network-based communication system maintains current state information, or nearly current state information, within a state table located at each datacenter.

In one or more embodiments, the systems and methods disclosed herein can detect events, process event information, and update state information at one of multiple datacenters. For example, one or more embodiments include systems and methods to detect an event at a datacenter, process event information for the event at the datacenter, and update state information in a state table maintained by the datacenter. Further, a second datacenter can also detect events, process event information, and update state information at the second datacenter (e.g., in a state table as the second datacenter).

In addition, one or more embodiments disclosed herein provide systems and methods for communicating state information between datacenters in a network-based communication system. For example, after processing state information at one datacenter, the datacenter can send a state information message that includes the processed state information to a second datacenter. The second datacenter can then update state information in a state table located at the second datacenter based on the state information message. Further, in some example embodiments, a datacenter can send a state table, or a portion of the state table, to a second datacenter. For example, when a datacenter is brought online within a network-based communication system, the datacenter can receive a current state table from another datacenter in the network-based communication system.

The system and methods herein also provide for datacenters in the network-based communication system to maintain current state information in the event that a datacenter loses connection with other datacenters in the network-based communication system. In particular, datacenters in the network-based communication system can connect to each other to form a mesh network. If a connection between two datacenters fails, the two datacenters can still communicate with each other via the other datacenters in the mesh network. Further, when the connection between the two datacenters is reestablished, the two datacenters can reconcile differences in their respective state tables to each maintain up-to-date state information.

Additional features and advantages disclosed herein will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe obtaining the above recited and other advantages and features of the invention, a more particular description of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered limiting of its scope, the invention will be described and explained with additional specificity and detail through the use of the accompanying drawings in which:

FIG. 5 illustrates an example data table used in the network-based communication system of FIG. 3 in accordance with one or more embodiments disclosed herein;

DETAILED DESCRIPTION

Figure 1:
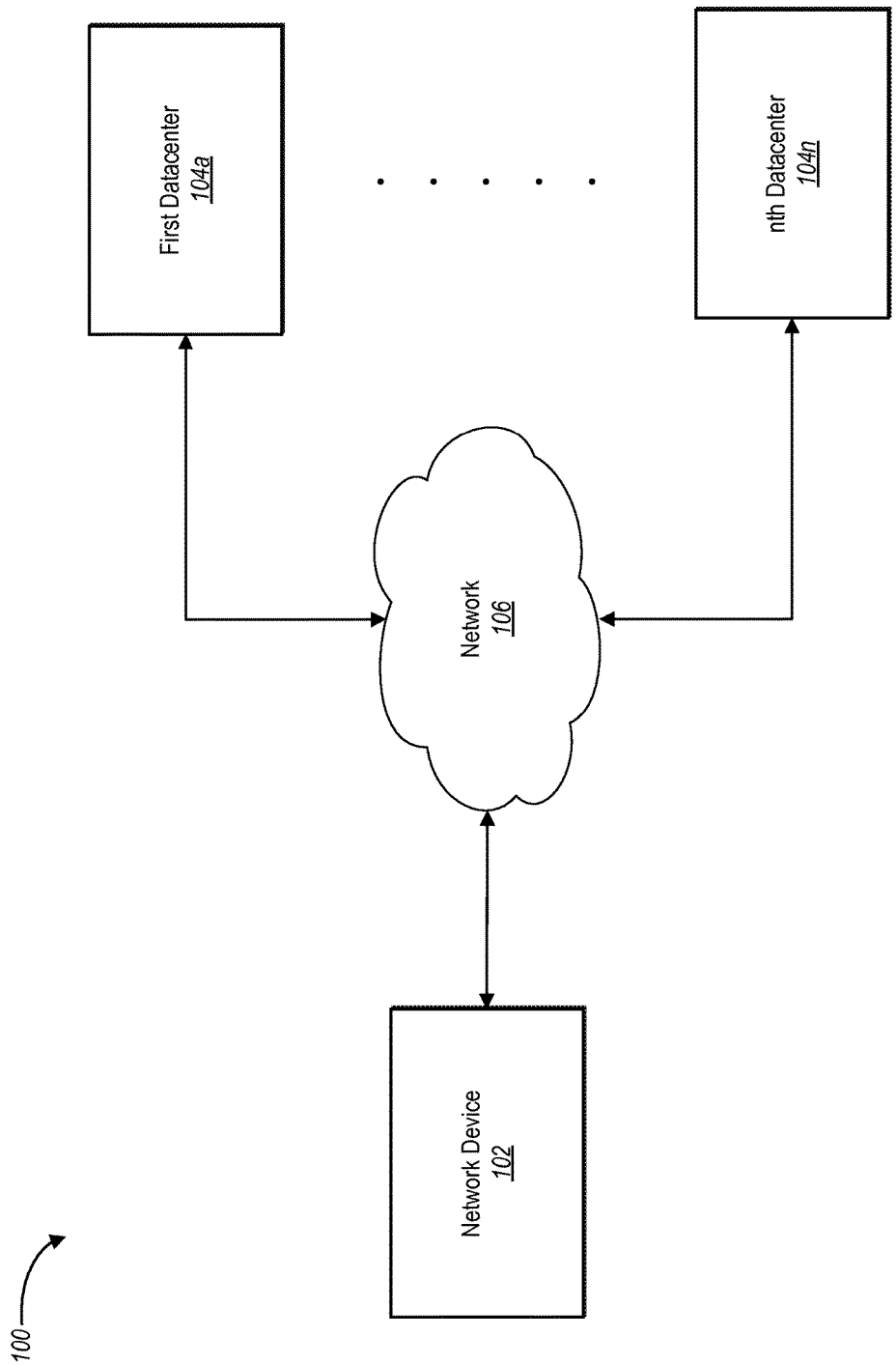
FIG. 1 illustrates a network-based communications system in accordance with one or more embodiments disclosed herein.

Embodiments disclosed herein provide benefits and/or solve one or more of the abovementioned problems or other problems in the art by improving communication in a network-based communication system. In particular, one or more example embodiments disclosed here include a network-based communication system that allows multiple datacenters to efficiently, effectively, and timely communicate state information between the multiple datacenters. For example, one or more embodiments include a network-based communication system that allows a datacenter to send updated state information to other datacenters in the network-based communication system when the datacenter obtains updated state information.

When a network-based communication system includes multiple datacenters that are simultaneously active, in some example embodiments, a network device may concurrently connect to multiple datacenters (e.g., a network device may map to and register with both a first datacenter and a second datacenter). Connecting to multiple datacenters allows the network device to guard against call and service interruptions when a connection with one datacenter fails by using a connection with the other datacenter. Thus, unlike conventional Internet Protocol ("IP") communication systems described above, where a network device is connected to only the central datacenter, a multi-datacenter network-based communication system, as disclose herein, a network-based communication system can allows a network device to actively connect with multiple datacenters. Additional detail regarding connecting to multiple datacenters at the same time is provided in U.S. application Ser. No. 14/335,103, which is incorporated herein by reference in its entirety.

When a network-based communication system includes multiple datacenters that are simultaneously active, however, there may arise the potential for conflicts in state information between the multiple datacenters. For example, a first datacenter can update state information in the state table located at the first datacenter based on the first datacenter detecting and processing an event. When this occurs, the state table at the first datacenter will differ from the state table at other datacenters in the network-based communication system. To address this issue, the network-based communication system can distribute current or updated state information between multiple datacenters within the network-based communication system so that each datacenter maintains a current and up-to-date state table.

A number of benefits are realized when the network-based communication system distributes current or updated state information between multiple datacenters in a network-based communication system. For example, when a network device switches from one datacenter to another in the network-based communication system, the service offered to the network device by the network-based communication system can seamlessly transition between datacenters because both datacenters maintain state tables containing up-to-date state information associated with the network device. For instance, if a network device becomes disconnected from one datacenter, the network device can seamlessly switch over to another datacenter without incident because the other datacenter has state information corresponding to the current state of the network device. For example, when a network device is on a call, each datacenter in the network-based communication system has state information regarding the participants of the call, the start time of the call, the duration of the call, etc.

In addition, in one or more embodiments, the network-based communication system can resolve conflicts in state information when one datacenter receives conflicting state information from other datacenters within the network-based communication system. For example, two related users belonging to the same user account may perform similar actions, such as each deducting funds from the user account. A first datacenter may detect the action of the first user, deduct funds from the user account at the first datacenter, and send the new balance to the second datacenter. Around the same time, the second datacenter may detect the action of the second user, deduct funds from the user at the second datacenter before receiving the updated balance from the first datacenter, and send the new balance to the first datacenter. At this point, both the first datacenter and the second datacenter may receive conflicting balance information regarding the shared user account from the other datacenter. Accordingly, the network-based communication system can detect and resolve the state information conflict at each datacenter within the network-based communication system.

Further, in some example embodiments, the network-based communication system can provide a mesh network between multiple datacenters. For example, a first datacenter sends out updated state information to a second datacenter, third datacenter, and a fourth datacenter. When the second datacenter receives the updated state information, the second datacenter can reflect the updated state information to the third datacenter and the fourth datacenter. Similarly, the third datacenter and the fourth datacenter can each reflect the updated state information from the first datacenter to others datacenters within the network-based communication system. In this manner, even if the one of the datacenters is cutoff from communication from the first datacenter, that datacenter will still receive the updated state information from another datacenter in the network-based communication system. Then, when the datacenter reconnects with the first datacenter, the datacenter and the first datacenter can reconcile differences in state information, if any. Accordingly, each datacenter in the network-based communication system possesses current state information.

In addition, in some embodiments, each datacenter in the mesh network can use safeguards to prevent duplicative and endless loops of state information from being reflected and re-reflected between each datacenter in the network-based communication system. For example, each datacenter can employ a message count that verifies how many times the datacenter has received a state information message. When a datacenter receives a state information message more than once, the datacenter can stop reflecting the state information message to other datacenters in the network-based communication system.

As another benefit, the network-based communication system can easily and quickly add an additional datacenter to the network-based communication system without requiring manual user interaction. For example, when an additional datacenter is added to the network-based communication system, an existing datacenter can automatically send an up-to-date state table to the new datacenter. Upon receiving the state table, the new datacenter can commence providing service to users using the current state information found in the state table. Similarly, if a datacenter temporarily disconnects from the network-based communication system, the datacenter, upon reconnection, can automatically receive current state information from another datacenter in the network-based communication system. For instance, the temporarily disconnected datacenter can obtain a copy of a state table from another datacenter because each datacenter has a current state table for each context.

In some example embodiments, the network-based communication system can update state information from a state table. In particular, the network-based communication system can add, update, replace, or remove state information entries in a state table. For example, a datacenter can detect a phone call. The datacenter can add the phone call along with information associated with the phone call to a state information entry in its state table. The datacenter can also provide the updated state information to other datacenters in the network-based communication system, for example, in a state information message.

In a similar manner, the datacenter can modify and/or remove state information in a state table and notify the other datacenters in the network-based communication system of the change. For example, the datacenter can send out updated state information to report the ongoing status of the phone call, or when the call ends to other datacenters. The other datacenters can update their state tables using the state information sent from the datacenter. In this manner, each datacenter in the network-based communication system can maintain similar state tables. Further, in some instances, the state tables at each datacenter in the network-based communication system will be identical.

Additional advantages and benefits of the network-based communication system will become apparent in view of the below description. In particular, one or more embodiments of the network-based communication system will be described below with reference to one or more figures. In addition, the following definitions of terms will be used to describe one or more features of the network-based communication system.

As used herein, the term "datacenter" refers generally to one or more computing devices that can facilitate the set up of a communication session between two or more network devices. In some configurations, a datacenter refers to a facility that houses computer systems and associated components, such as telecommunications and storage systems. For example, one of skill on the art will appreciate that a datacenter may comprise a single computing device or that a datacenter may comprise a building housing computers, servers, and other components facilitating communication for thousands of network devices.

In addition, the term "network device" as used herein refers generally to a computing device that is used to participate in a communication session, such as a multi-device communication session. A network device can communicate with a datacenter and other network devices. In general, a network device is associated with a user using the network device. For example, a user may use a network device to communicate with a second user associated with a second network device. A variety of network devices may employ VoIP technology, such as personal computers, hand-held devices, mobile phones, smartphones, and other electronic access devices. As an example, a network device may be a dedicated VoIP device or soft VoIP device. Dedicated and soft devices are described in greater detail below in connection with FIG. 10.

As used herein, the term "event" refers generally to an occurrence that causes a change (or lack thereof) in state information. An event can be associated with a context, such as a user account. For instance, as used herein, an event can include participating in a communication session; and/or adding, deleting, configuring, or modifying user account information and/or user services. For example, multiple events may be associated with a voicemail service. For instance, an event can include notifying a user of a new voicemail, marking a voicemail as read, deleting or archiving a voicemail. Other examples of events include adding to a user account, changing a user password, or using services that are associated with service fees. An event may also be associated with one or more status updates in a network device or a datacenter. For example, an event may include a confirmation that a state information message has been received and/or been processed at a datacenter.

As used herein, the term "state information" refers generally to the state, status, or condition of a context, such as user account. For example, state information indicates the current state of a user account balance, the status of one or more network devices associated with the user account, the network configuration of a user account (e.g., private branch exchange (PBX) configuration), user and user account passwords, user and user account preferences and settings, call queue information, voicemail information, etc. State information can be associated with a user account, which can have one or more users and can be associated with one or more network devices. Additionally, while the term state information, as used herein, refers to a user account having one or more users, in some embodiments, state information may refer to and be associated with each user within a user account.

As used herein, the term "communication session" refers generally to a communication interaction between one or more network devices that occurs over a network-based communication system. For example a communication session may include voice or video calling, video conferencing, streaming multimedia distribution, instant messaging, presence information sharing, file transferring, faxing over IP, and online gaming. For instance, a session may be part of the session initiation protocol ("SIP"), which is a signaling communications protocol commonly used in network-based communication systems. Likewise, a session may refer to a communication session using other protocols common to IP peer communications.

As used herein, the term "connection" refers generally to an established communication link between at least two computing devices. For instance, two or more network devices connect to, or with, each other when each network device acknowledges the connection with the other network device(s). For example, as further described below, a connection between a network device and a datacenter may occur when the network device is mapped to and registers with the datacenter. A connection can include one or more types of connections, such as a switched circuit connection, a virtual circuit connection, or a network connection. For example, a connection between multiple network devices occurs over a network, such as the Internet, and data sent between the multiple network devices via the connection may employ various network paths.

Although the disclosure discusses one or more example embodiments in reference to VoIP telephone network-based communication systems, it should be understood that the principles, systems, and methods disclosed herein may also be effectively used in other types of packet-based IP communication systems and unified (e.g., real-time) communication systems. For instance, the principles described may be used for sending faxes, text messages, and voice-messages over a network-based communication system.

FIG. 1, for example, illustrates a network-based communications system 100 (or simply "system 100") in accordance with one or more embodiments disclosed herein. As illustrated by FIG. 1, the system 100 can include, but is not limited to, a network device 102, a first datacenter 104a, and an nth datacenter 104n (collectively referred to as "datacenters 104"). As shown, the system 100 can include multiple datacenters 104. Similarly, while not illustrated, the system 100 may include multiple network devices (collectively referred to as "network devices 102"). For example, the system 100 can include almost any number of network devices 102 and/or datacenters 104.

A network 106 can connect the network device 102 and the datacenters 104. In some configurations, the network 106 can be the Internet, an intranet, a private network, or another type of computer network. The network 106 can be a combination of Internet and intranet networks. Additional details regarding the network will be discussed below with respect to FIGS. 9 and 10.

As will be explained below in additional detail, a network device can connect to multiple datacenters. In addition, datacenters can connect to each other. For example, the first datacenter 104a may detect an event occurring on a network device 102 triggered by a user action. In response, the first datacenter 104a can update state information in a state table at the first datacenter 104a. In addition, the first datacenter 104a can send the updated state information to other datacenters 104 in the system 100, for example, in a state information message. Further, when the first datacenter 104a receives state information from another datacenter 104 in the system 100, the first datacenter 104a can reflect the state information message to other datacenters 104 in the system 100.

Figure 2:
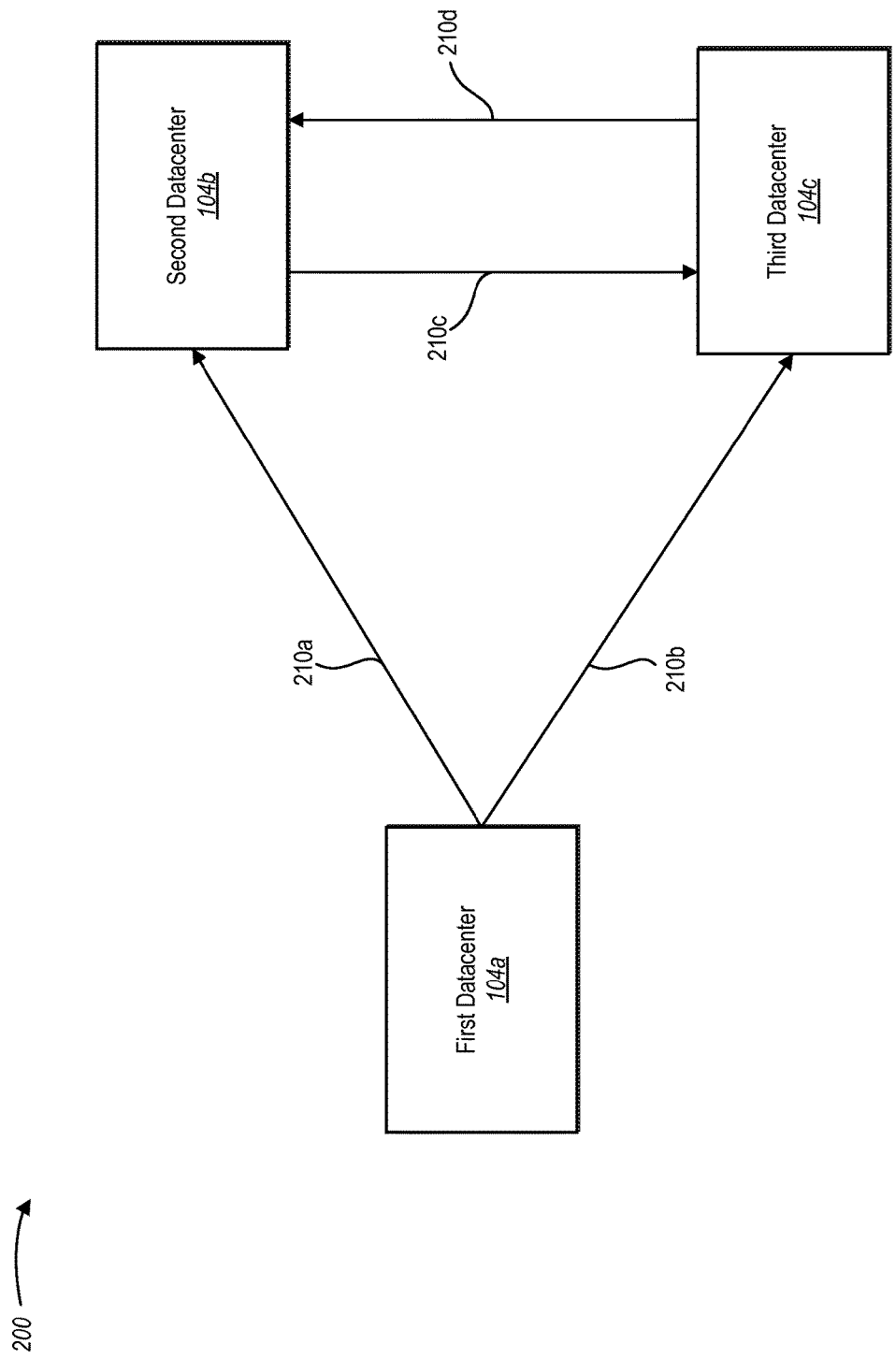
FIG. 2 illustrates multiple datacenters in communication with each other in accordance with one or more embodiments disclosed herein.

FIG. 2 illustrates a network-based communication system 200 (or "system 200") that includes multiple datacenters 204. The datacenters 204 in FIG. 2 can be example embodiments of the datacenters 104 described in connection with the network-based communication system 100 of FIG. 1. In particular, the datacenters 204 in FIG. 2 can include a first datacenter 204a, a second datacenter 204b, and a third datacenter 204c.

In some embodiments, the first datacenter 204a can detect one or more events that occur within the system 200. For example, a user can perform an action, such as adding money to a user account, checking a voicemail message, parking a network device, or participating in a phone call. The first datacenter 204a can detect one or more events triggered by the user action. For example, the user can be using a network device (such as network device 102) and the first datacenter 204a can detect an event that occurs on the network device when the user performs one or more user actions.

The first datacenter 204a can process a detected event to obtain state information. For example, upon detecting an event, the first datacenter 204a can obtain state information corresponding to the event. For instance, when a user places a call on a network device, the first datacenter 204a can identify the network device as being on a call. Further, the first datacenter 204a can obtain corresponding information, such as whom the user is calling, the duration of the call, where the users are located, numbers associated with client devices corresponding to the users, etc.

The first datacenter 204a can use the identified information to update a state table at the first datacenter 204a. As described below, a datacenter can add, update, or delete state information from a state table store on the datacenter. For example, the first datacenter 204a can add call information to an entry in state table on the first datacenter 204a when a user initiates a call from a network device. The first datacenter 204a can also change state information in the state table entry. For example, when the status of the network device changes from "available" to "on a call," the first datacenter 204a can update state information corresponding to the network device in the state table.

As illustrated in FIG. 2, the first datacenter 204a can send a state information message 210 to the other datacenters 204 in the system 200. The state information message 210 can include a message identifier, datacenter information, and/or state information. In some example embodiments, the state information can correspond to a context, such as a user account, a handle, and/or one or more network devices. State information messages are described in additional detail below in connection with FIG. 5.

As an example, the first datacenter 204a can send state information message 210a to the second datacenter 204b and state information message 210b to the third datacenter 204c. Upon receiving the state information message, the second datacenter 204b can update its state table using the state information found in the state information message 210. For example, the second datacenter 204b can update a context within the state table using the state information from the state information message 210. Similarly, the third datacenter 204c can update its state table using the state information found in the state information message 210.

When a datacenter receives a state information message 210 from another datacenter, the receiving datacenter can reflect (e.g., forward or send a copy) the state information message 210 to one or more other datacenters. For example, the second datacenter 204b can reflect the state information message 210 received from the first datacenter 204a to the third datacenter 204c. In particular, the second datacenter 204b can forward a copy of the state information message 210 to the third datacenter 204c, shown as state information message 210c. In a similar manner, the third datacenter 204c can reflect the state information message 210 received from the first datacenter 204a to the second datacenter 204b, shown as state information message 210d.

In one or more embodiments, each datacenter can determine whether to reflect a state information message to other datacenters. For example, the second datacenter 204b can reflect the state information message 210 to the other datacenters 204 in the system 200 when the second datacenter 204b has not previously received the state information message 210 (or a copy of the state information message 210). In other words, upon receiving a state information message 210 for the first time, the second datacenter 204b can reflect the state information message 210 to the other datacenters 204 in the system 200. Further, when the second datacenter 204b receives a copy of a previously received state information message, the second datacenter 204b can determine not to reflect the state information message. In this manner, the second datacenter 204b can prevent the state information message from continuously reflecting back and forth between the datacenters 204 in the system 200.

In some embodiments, each datacenter can employ a message count to determine whether to reflect a state information message to other datacenters. For example, upon receiving the state information message 210b from the first datacenter 204a, the third datacenter 204c can initiate a message count associated with the state information message 210. For instance, the third datacenter 204c can initialize the message count associated with the state information message 210 to one.

Each time the third datacenter 204c receives a copy of the state information message 210, the second datacenter 204b can increment the message count associated with the state information message 210. For example, the third datacenter 204c can receive state information message 210c from the second datacenter 204b, upon which the third datacenter 204c can increment the message count associated with the state information message 210 to two (2). Accordingly, the third datacenter 204c can also determine not reflect the state information message 210 when the message count associated with the state information message 210 is greater than one (1).

In reflecting the state information message, a datacenter need not send a copy of a state information message to every datacenter in the system 200. For example, the second datacenter 204b can determine not to reflect the state information message 210 back to first datacenter 204a. More specifically, the second datacenter 204b can identify that the first datacenter 204a created the state information message 210. As such, the second datacenter 204b can exclude the first datacenter 204a when reflecting the state information message 210 because the second datacenter 204b has identified that the first datacenter 204a already has a copy of the state information message 210.

As another example, the third datacenter 204c can receive the state information message 210c from the second datacenter 204b. Further, a network disconnection may have prevented the state information message 210b from being directly sent to the second datacenter 204b from the first datacenter 204a. Thus, the third datacenter 204c may be receiving the state information message 210 from the second datacenter 204b for the first time, even when the state information message 210 originated from the first datacenter 204a. In this case, the third datacenter 204c can exclude both the first datacenter 204a and the second datacenter 204b when reflecting the state information message 210 because the second datacenter 204b has identified, based on the contents of state information message 210, that both the first datacenter 204a and the second datacenter 204b have received the state information message 210.

In some embodiments, the system 200 can use the message count at each datacenter to perform network analytics and/or network diagnostics. For instance, when the message count at a datacenter is lower than expected, the system 200 can use this information as an indication that a connection fault has occurred. Further, one will appreciate that as the number of datacenters in the system 200 increase, information the system 200 obtains from the message count at each datacenter becomes more valuable. To illustrate, the system 200 may include five (5) datacenters. Under typical conditions, when a state information message is received at a datacenter for the first time, the receiving datacenter sends a copy of the state information message to the other datacenters in the system 200, excluding the datacenter that created and/or sent the state information message. As a result, each datacenter in the system 200 should have a message count of four (4) for each state information message. In other words, each datacenter should receive the state information message for the other datacenters in the system 200 at least once. However, if one datacenter has a message count that is below four (4) on a regular basis, the system 200 can use the inconsistency to detect whether a fault is present in the system 200.

As a specific example, when the first datacenter 204a sends the state information message 210 to the second datacenter 204b and the third datacenter 204c, the second datacenter 204b and the third datacenter 204c can forward the state information message 210 to each other (shown as state information messages 210c and 210d). As a result, the message count for each state information message at both the second datacenter 204b and the third datacenter 204c is two (2). If the final message count at the second datacenter 204b is only one (1), however, the second datacenter 204b can identify the possibility of a connection fault either between the second datacenter 204a and either the first datacenter 204a or the third datacenter 204c.

Figure 3:
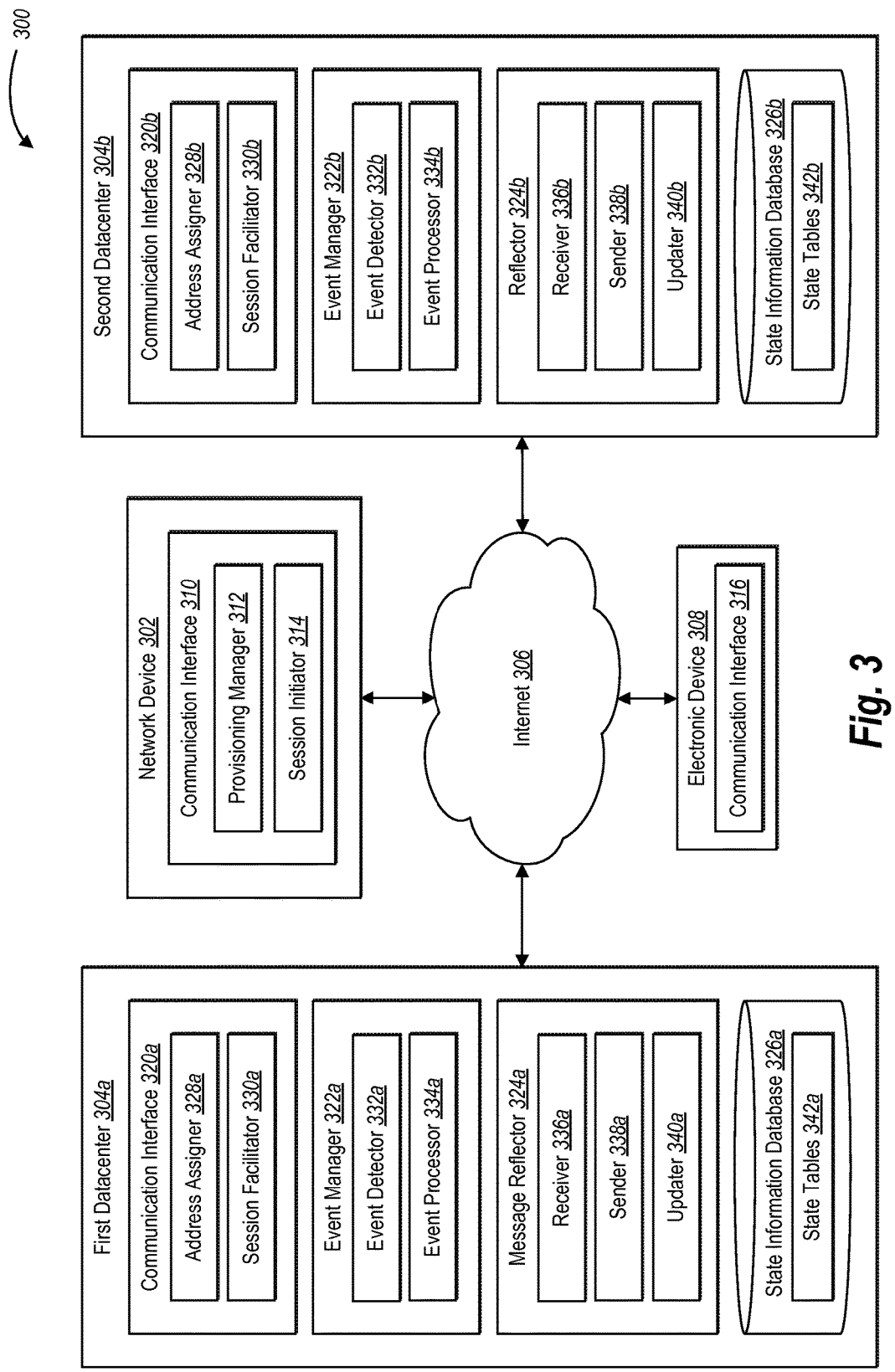
FIG. 3 illustrates an exemplary network-based communication system in accordance with one or more embodiments disclosed herein.

FIG. 3 illustrates an exemplary network-based VoIP communication system 300 (hereafter "VoIP system 300") according to principles described herein. As illustrated, the system 300 includes a network device 302, a first datacenter 304a, and a second datacenter 304b. In some embodiments, the system 300 also includes an electronic device 308.

The VoIP system 300 may be one exemplary configuration of the system 100 described in connection with FIG. 1. For instance, the network device 302 may be one exemplary embodiment of the network device 102. Likewise, the first datacenter 304a and the second datacenter 304b may be exemplary embodiments of the datacenters 104a-n described in connection with FIG. 1. Although the VoIP system 300 is described as having a first datacenter 304a and a second datacenter 304b (collectively referred to as "datacenters 304"), the principles described with respect to FIG. 3 can be implemented within a VoIP system 300 having any number of network devices 302, datacenters 304, and electronic devices 308.

The network device 302 and/or the electronic device 308 may connect to the datacenters 304 via the Internet 306. In some configurations, the network device 302 and/or the electronic device 308 may be directly connected to one or more datacenters 304, or via a private network. In addition, the network device 302 and/or the electronic device 308 may securely connect to a datacenter via a secure connection, for example, using secure sockets layer ("SSL") protocol, or another cryptographic or secure protocol.

In some configurations, the network device 302 may be a VoIP device. The network device 302 may allow a user to communicate with other users. For instance, the network device 302 may facilitate voice and data communication sessions between users. The network device 302 may also allow a user to modify preferences and access user account settings via a connection with one or more datacenters. In addition, as described above, users may communicate with their peers using other forms of communication provided by network device 302, such as a videoconference.

As illustrated, the network device 302 includes a communication interface 310. In addition, the network device 302 may also include input and output audio/video functionality, as described in additional detail below in connection with FIG. 9. For example, the network device 302 may be a dedicated device, or a soft device, such as a dedicated VoIP device.

As illustrated, the communication interface 310 may include a provisioning manager 312 and a session initiator 314. In general, the provisioning manager 312 maps and registers the network device 302 to one or more datacenters 304. The session initiator 314 facilitates communications between users via the network device 302.

One of skill in the art should note that components 312-314 can be independent from the communication interface 310. For example, the session initiator 314 can be a separate module on the network device 302. In addition, one or more of the above listed components included in the communication interface 310 can be located outside of the network device 302. Further, each of the components 312-314 of VoIP system 300 can be in communication with one another using any suitable communication technologies. Also, although components 312-314 are shown to be separate in FIG. 3, any of components 312-314 may be combined into fewer components, such as into a single component, or divided into more components as can serve a particular embodiment. In addition, components 312-314 can be located on, or implemented by, one or more network devices, such as those described below in relation to FIG. 9.

Alternatively, portions of components 312-314 can be located on a network device, while other portions are located on one or more datacenters 304.

Components 310-314 can comprise software, hardware, or both. For example, components 310-314 can comprise one or more instructions stored on a non-transitory computer-readable storage medium and executable by processors of one or more computing devices. When executed by the one or more processors, the computer-executable instructions of VoIP system 300 can cause a network device and/or datacenter to perform the methods described herein. Alternatively, components 310-314 can comprise hardware, such as a special purpose processing device to perform a certain function or group of functions. Additionally or alternatively, components 310-314 can comprise a combination of computer-executable instructions and hardware.

As mention above, the communication interface 310 can send and receive data. For example, the communication interface 310 may transmit or receive queries, requests, acknowledgements, signals, indications, etc., between the network device 302 and one or more of the datacenters 304. For instance, the communication interface 310 can facilitate connecting to the first datacenter 304a and accessing services provided by the VoIP system 300.

In one or more embodiments, the provisioning manager 312 connects the network device 302 to one more datacenters 304. For example, the provisioning manager 312 can facilitate the connection between the network device 302 and the first datacenter 304a. In addition, or in the alternative, the provisioning manager 312 can facilitate the connection between the network device 302 and the second datacenter 304b. The network device 302 can communicate with other network devices 302 and/or other electronic devices 308 via the VoIP system 300 once connected with the datacenter 304.

As part of the provisioning process, the provisioning manager 312 can request a network device address from a datacenter 304 for the network device 302. For example, the network device address can indicate where other network devices on the VoIP system 300 can reach the network device 302. As described below, the address assigner 328 on a datacenter 304 can assign a network device address to the network device 302.

The session initiator 314 can facilitate communications between users via the network device 302. For example, the session initiator 314 can initiate audio, video, and other types of communication sessions between users. The session initiator 314 can employ protocol, such as SIP, in facilitating communication sessions between users. As described in further detail below, the session initiator 314 can communicate with the session facilitator 328 on a datacenter to which a network device connects.

A user may use a network device to gain access to the VoIP system 300. Because network devices are connected to the datacenters 304, when a user performs an action using a network device, the user action may trigger an event that one of the datacenters 304 detects. For example, if the network device 302 is connected to the second datacenter 304b and a user uses the network device 302 to perform an action, the second datacenter 304b can detect the event triggered by the user action on the network device 304. The second datacenter 304b can also notify other datacenters 304 of state information changes that result from the event.

As illustrated in FIG. 3, the VoIP system 300 may include an electronic device 308. For example, the electronic device 308 may be a personal computer, laptop, or mobile device.

Additional examples of electronic devices 308 are described below in connection with FIG. 9.

In one or more embodiments, the electronic device 308 includes a communication interface 316. The communication interface 320 may send and receive communications between the electronic device 308 and one or more datacenters 304. For instance, the communication interface 316 can receive information relating to state information for a context, such as a user account.

In particular, a user may use the electronic device 308 to lookup, add, deleted, modify, or replace user account information. For example, a user can add funds to a user account using the electronic device 308. In addition, the user can use the electronic device 308 to check a voicemail, change a password, add another user, or terminate one or more services. When a user uses the electronic device 308 to access information or services provided by the VoIP system 300, one of the datacenters 304 may detect an event and notify the other datacenters 304 of the event via a state information message.

As mentioned above and as illustrated in FIG. 3, the VoIP system 300 may include a first datacenter 304a and a second datacenter 304b. The first datacenter 304a includes a communication interface 320a, an event manager 322a, a message reflector 324a, and a state information database 326a. Similarly, the second datacenter 304b includes a communication interface 320b, an event manager 322b, a message reflector 324b, and a state information database 326b.

For convenience, the datacenters 304 will be described with reference to the first datacenter 304a. The second datacenter 304b, however, may be described similarly to the first datacenter 304a described below. For example, the communication interface 320b, event manager 322b, message reflector 324b, and state information database 326b of the second datacenter 304b may perform similar operations as the communication interface 320a, event manager 322a, message reflector 324a, and state information database 326a of the first datacenter 304a. Further, while not illustrated, additional datacenters such as a third datacenter can include similar components and perform similar functions as the first datacenter 304a.

As illustrated, the communication interface 320a on the first datacenter 304a can include an address assigner 328a and a session facilitator 330a. The event manager 322a can include an event detector 332a and an event processor 334a. The message reflector 324a can include a receiver 336a, a sender 338a, and an updater 340a. Each of the components 320a-326a of VoIP system 300 may be in communication with one another using any suitable communication technologies. It will be recognized that although components 320a-326a are shown to be separate in FIG. 3, any of components 320a-326a may be combined into fewer components, such as into a single component, or divided into more components as may serve a particular embodiment. In addition, components 320a-326a may be located on, or implemented by, one or more network devices, such as those described below in relation to FIG. 9. Alternatively, portions of components 320a-326a can be located on a network device, while other portions are located on one or more datacenters.

Components 320a-342a can comprise software, hardware, or both. For example, components 320a-342a can comprise one or more instructions stored on a non-transitory computer-readable storage medium and executable by processors of one or more computing devices. When executed by the one or more processors, the computer-executable instructions of the VoIP system 300 can cause a network device and/or datacenter to perform the methods described herein. Alternatively, components 320a-342a can comprise hardware, such as a special purpose processing device to perform a certain function or group of functions. Additionally or alternatively, components 320a-342a can comprise a combination of computer-executable instructions and hardware.

The communication interface 320a can send and receive data. For example, the communication interface 320a may send or receive queries, requests, acknowledgements, signals, indications, etc., between the network device 302 and the first datacenter 304a. For instance, the communication interface 320a can facilitate a connected between the network device 302 and the first datacenter 304a. The communication interface 320a can also provide services to a network device connected to the first datacenter 304a.

As mentioned above, the communication interface 320a includes an address assigner 328a and a session facilitator 330a. The address assigner 328a can assign a network device address to a network device when the network device first connects to a datacenter. For example, the address assigner 328a may provide a network device address to the network device 302 that includes network device identifier associated with the network device 302. For instances, the network device address may be tied to the MAC (media access control) address of the network device 302. Alternatively, the network device address may be in the form of <network device identifier>@VoIP-System.net. In addition, when the address assigner 328a provides an address to the network device 302, the address assigner 328a may also register the network device 302 with the VoIP system.

In particular, in one or more embodiments, the address assigning process may be in accordance with session protocol, such as SIP. SIP communications exhibit a SIP uniform resource identifier ("URI" or "SIP URI") that identifies each participant of a SIP session. In one embodiment, the SIP URI comprises a username and a domain in the form of user@domain. Further, the identifier "SIP" may precede the SIP address to indicate that the communication is a SIP communication. For instance, the SIP URI may take the form of SIP:user@domain.net or SIP:user@domain.net:port. In addition, the SIP URI may include a globally routable domain. For example, one network device is registered with SIP URI userA@domain.com, while a second device is registered with the SIP URI userB@domain.com. In some configurations, a SIP URI may be registered with multiple network devices.

The session facilitator 328a can provide communication services to a user using a network device. For example, the session facilitator 328a can facilitate a communication session between users. For instance, the session facilitator 328a can establish a media bridge connection between the network devices 302 of the two or more users. As described above, the session facilitator 328a may provide communication services to a session initiator 314 on a network device.

As illustrated, the event manager 322a includes an event detector 332a and an event processor 334a. In one or more embodiments, the event detector 332a detects events. For example, the event detector 332 can detects events triggered by a user action on a network device. Alternatively, the first datacenter 304a can detect an event when an electronic device 308 triggers an event, such as when a user add funds to their user account via the electronic device 308. For instance, the first datacenter 304a can detect an event when a user adds money to their user account using a smartphone.

In some embodiments, the event detector 332a can detect an event triggered by the VoIP system 300. For example, the first datacenter 304a can detect an event when the VoIP system 300 performs an update. As another example, the first datacenter 304a can detect an event when the VoIP system 300 adds a datacenter to the VoIP system 300 that was previously office. The first datacenter 304a can detect a number of other events triggered by the VoIP system 300.

Upon the first datacenter 304a detecting an event, the event processor 334a can process the event. In particular, the event processor 334a can process the event to identify state information based on the detected event. Further, the event processor 334a can use the identified state information to update a state table 342a stored in the state information database 326a on the first datacenter 304a. For example, the event processor 334a can update an state table entry in the state table 342a In particular, the event processor 334a can add, remove, replace, and/or update state information in a state table 342a based on an event. For example, when the network device 302 joins a communication session, the event processor 334a can add an entry to the state table 342a indicating that the network device 302 has joined a communication session, which other network devices are participating in the communication session, the time communication session began, the type of media used in the communication session, a shared security element of the communication session, the duration of the communication session, etc. When the network device 302 finishes the communication session, the event processor 334a can remove the entry from the state table 342a.

In some example embodiments, the event processor 334a can update multiple entries in the state table 342a in response to a single event. For example, in addition to adding or removing an entry when the network device 302 joins or leaves a communication session, the event processor 334a can update an entry in the state table 342a corresponding to the status of the network device 302 from "available" to "on call" or vise versa. Further, the event processor 334a can update a call log associated with a user account to include information corresponding to the communication session.

In one or more embodiments, the event processor 334a can send processed or updated events to the other datacenters 304 in the VoIP system 300. For example, the event processor 334a at the first datacenter 304a can send state information to the second datacenter 304b. In particular, the event processor 334a can send new or updated state table entries to the other datacenters 304 in the VoIP system 300. In this manner, each datacenter 304 that receives the state information message can use the state table entry in the state information message to directly update its own state table without additional needing to reprocess the event. In other words, when the second datacenter 304b receives a state information message from the network device 302, the second datacenter 304b can either add the state table entry directly into its state table 342b, or the second datacenter 304b can replace/modify an existing entry in its state table 342b with the information in the state information message. Alternatively, the second datacenter 304b can remove a state table entry from its state table 342b (e.g., the state information message has an instruction to remove or delete a state table entry). As such, each of the datacenters 304 in the VoIP system 300 can maintain a current state table without requiring redundant event processing at each of the datacenters 304.

In some embodiments, the event processor 334a at a datacenter can send a state table to another datacenter. For example, when a datacenter joins the VoIP system 300, the event processor 334a at the first datacenter 304a can send a copy of its state table 342a to the new datacenter. Similarly, the event processor 334a can send the state table 342a to the second datacenter 304b after the second datacenter 304b disconnects and reconnects with the VoIP system 300, or upon request from the second datacenter 304b. Alternatively, the first datacenter 304a can send a portion of the state table 342a to the second datacenter 304b.

In some example embodiments, the event processor 334a at the first datacenter 304a can compare state tables. For example, the event processor 334a can compare copies of state table entries between two or more datacenters to determine whether the state table entries match. For instance, the event processor 334a can compare copies of the state information by comparing hashes or checksums of the copies to determine if the copies match. When state tables conflict, the event processor 334a can resolve the conflict, as described below.

In general, the event processor 334a sends out a state information message to each other datacenters in the VoIP system 300. In some instances however, one or more of the datacenters 304 may not receive the state information message. To overcome this challenge, one or more of the datacenters 304 can include a message reflector 324a, as mentioned above. The message reflector 324a helps the VoIP system 300 forms a mesh network between datacenters 304 to ensure that every state information message reaches each of the datacenters 304 in the VoIP system 300.

As illustrated in FIG. 3, the message reflector 324a can include a receiver 336a, a sender 338a, and an updater 340a. In one or more embodiments, the message reflector 324a facilitates the handling of state information messages that the first datacenter 304a receives from other datacenters. For example, the receiver 336a can receive a state information message from a datacenter. The receiver 336a can next determine whether the first datacenter 304a has previously received the state information message. Depending on the determination of whether the first datacenter 304a has received the state information message, the receiver 336a can send a copy of the state information message to the first datacenter 304a, (e.g., via the sender 338a described below).

In addition, the receiver 336a can send the contents of the state information message to the updater 340a. For example, the receiver 336a can send a state table entry found in the state information message to the updater 340a. The updater 340a can use the state table entry to update a state table 342a, as describe below.

In some embodiments, the receiver 336a can initiate a message count associated with a state information message. As described above, the receiver 336a may use the message count to determine when to reflect (e.g., send copies) the state information message to the other datacenters 304 in the VoIP system 300. Further, as described above, the receiver 336a can instruct the sender 338a to exclude specific of the datacenters 304 when sending the state information message to the other datacenters 304 in the VoIP system 300.

The sender 338a can send copies of state information messages to other datacenters in the VoIP system 300, as described above. For example, upon receiving a state information message from a third datacenter, the first datacenter 304a can reflect a copy of the state information message to the second datacenter 304b. Alternatively, if the first datacenter 304a received the state information message from the second datacenter 304b, the sender 338a can refrain from reflecting the state information message back to the second datacenter 304b.

The updater 340a can update the state table 342a based on state information messages. For example, the updater 340a can update, modify, or replace an entry in the state table 342a with state information included in the state information message. In some embodiments, the state information message can include a state table entry itself. In this embodiment, the updater 340a can direct add the state table entry to the state table 342a, or can replace a state table entry in the state table 342a with the state table entry included in the state information message.

In some embodiments, the updater 340a can replace all or a portion of the state table 342a with a state table 342a included in a state information message. Regardless of the method the updater 340a uses to modify the state table 342a, the updater 342a can maintain, at the first datacenter 304a, current state table without the first datacenter 304a needing to individually processing each event that occurs in the VoIP system 300.

One will appreciate that the VoIP system 300 can maintain current and up-to-date state tables at each datacenter in the VoIP system 300 using the systems and methods disclosed herein. Further, each datacenter can maintain a current state table while conserving processing resources at each datacenter within the VoIP system 300. In addition, if one of the datacenter 304 where to suffer a disconnection, any other datacenter in the VoIP system 300 could seamlessly step in to provide services provided by the faulty datacenter because each of the datacenters 304 in the VoIP system 300 maintains an individual and up-to-date state information table that includes state information for every event that occurs in the VoIP system 300.

Figure 4A:
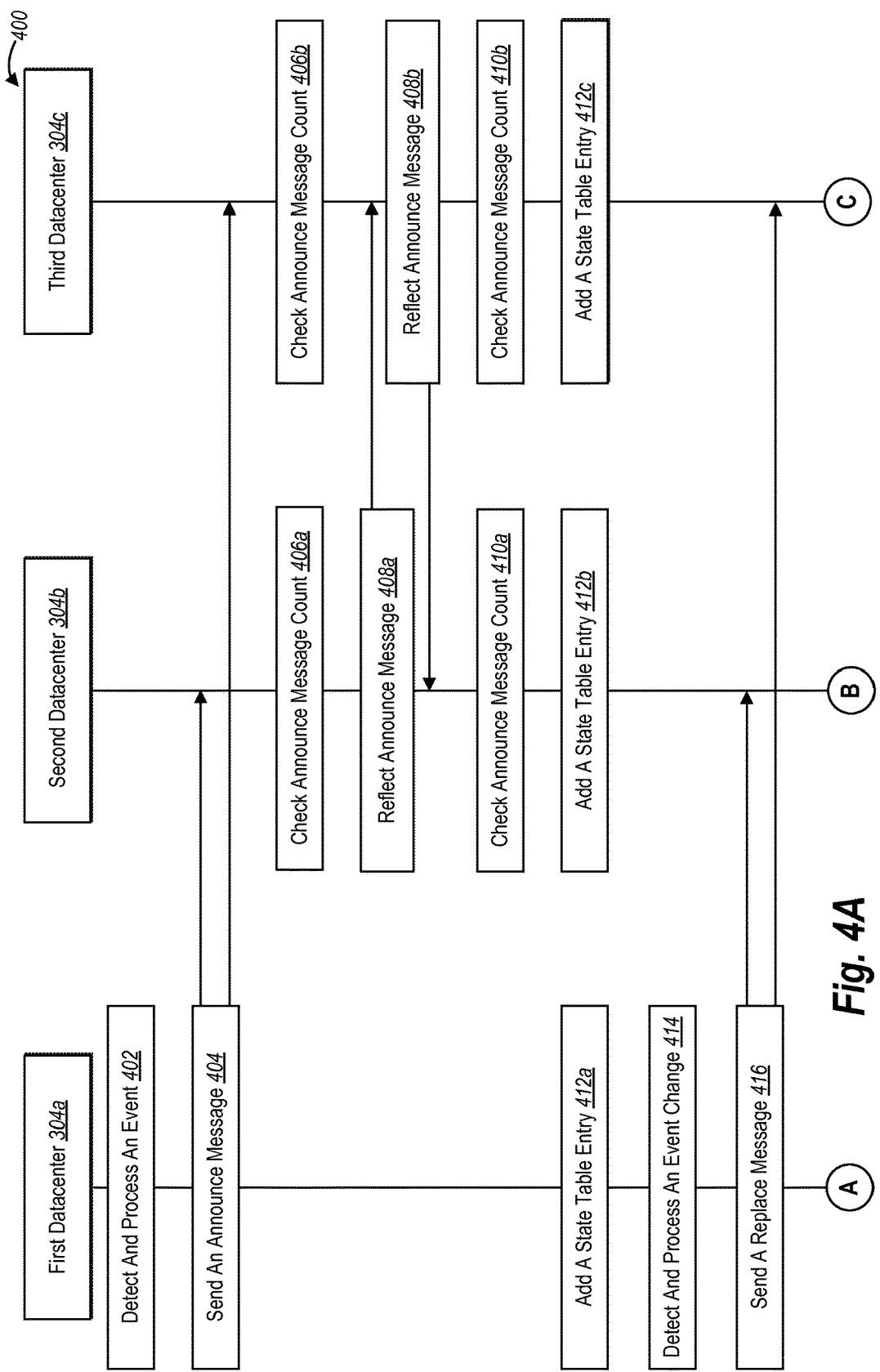
FIGS. 4A-B illustrate a sequence-flow diagram illustrating interactions between a first datacenter, a second datacenter, and a third datacenter in accordance with one or more embodiments disclosed herein.
Figure 4B:
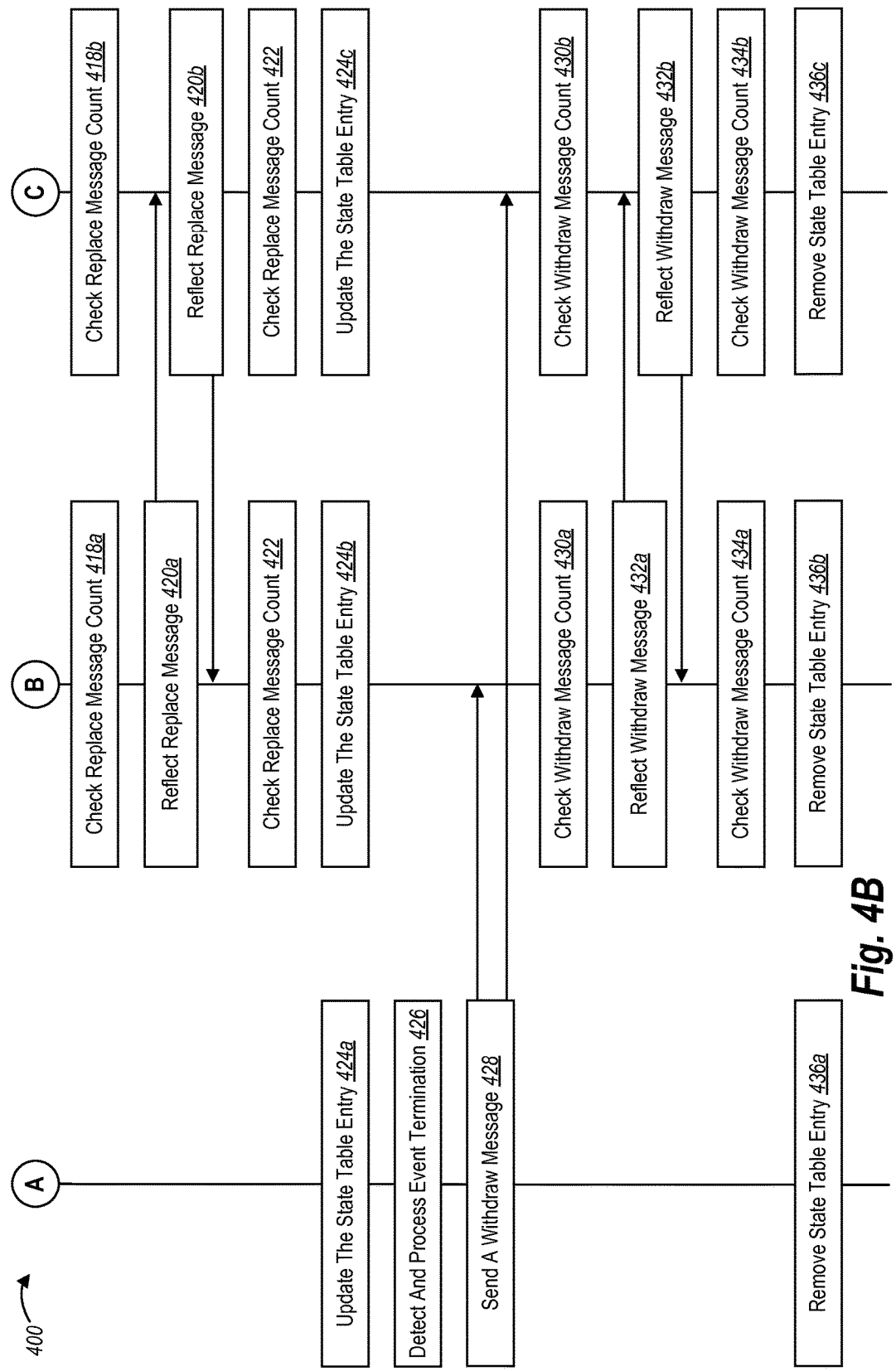

FIGS. 4A-B illustrates a sequence-flow method 400 illustrating interactions between a first datacenter 304a, a second datacenter 304b, and a third datacenter 304c (or collectively "datacenters 304") in the VoIP communication system 300 of FIG. 3 in accordance with one or more embodiments disclosed herein. In particular, the method 400 of FIG. 4 illustrates an example method of detecting an event, and updating state tables 342 on each of the datacenters 304 throughout the VoIP system 300 based on occurring events.

To illustrate, in step 402, the first datacenter 304a can detect and process an event. For example, the event can occur on the network device 302 and triggered by a user action. For instance, a user can add funds to a user account, listen to a voicemail, or read a message. Alternatively, a user can join a conference call with other users. The first datacenter 304a can detect the event and process the event as described above.

In step 404, the first datacenter 304a can send an announce message to the second datacenter 304b and the third datacenter 304c. An announce message (e.g., a ANNOUNCE message) can be a type of state information message that announces the creation of a new state table entry. For example, the event processor 334a on the first datacenter 304a can send an announce message to the second datacenter 304b announcing that a network device is joining a communication session. The announce message can also include additional information, such as other network devices with whom the network device is participating in the communication session, the start time of the communication session, type of media used in the communication session, etc.

In particular, an announce message can include a context, a handle, and one or more data elements that relate to the context. The context can correspond to a user account, the handle can correspond to an event, and the data element can correspond to a new state table entry. In some embodiments, the data element in the announce message can be a value, number, Boolean value, text string, link, etc. For example, the data element can indicate the level of access for a network device on the VoIP system 300.

In step 406, the second datacenter 304b and the third datacenter 304c can check a message count associated with the announce message. In particular, step 406a includes the second datacenter 304b checking a message count associated with the announce message. Similarly, step 406b includes the third datacenter 304c checking a message count associated with the announce message. As described above, a receiver at each of the datacenters 304 can initiate a message count associated with announce message if the corresponding datacenter is receiving the announce message for the first time. Alternatively, the receiver can increment the message count associated with the announce message if the corresponding datacenter has previously received the announce message.

In some instances, step 406a and step 406b can occur in parallel. In other words, if the second datacenter 304b and the third datacenter 304c each receive the a announce message from the first datacenter 304a around the same time, then both the second datacenter 304b and the third datacenter 304c may check the message count associated with the state information message at around the same time. Accordingly, depending on when the announce message arrives at the second datacenter 304b and/or the third datacenter 304c, step 406a can occur before, after, during, or concurrently with step 406b. Alternatively, the second datacenter 304b or the third datacenter 304c may skip the check message count associated with the announce message if either of the datacenters 304 does not receive the announce message.

In checking the message count associated with the announce message, the second datacenter 304b and the third datacenter 304c can determine whether to reflect the announce message. For example, as shown in steps 408a, the second datacenter 304b can reflect the announce message to the third datacenter 304c based on the message count associated with the announce message, as describe above. Similarly, in step 408b, the third datacenter 304c can reflect the announce message to the second datacenter 304b.

Steps 408a and 408b can occur around the same time. In other words, depending on when the second datacenter 304b and the third datacenter 304c each receive the announce message from the first datacenter 304a, both the second datacenter 304b and the third datacenter 304c can determine to reflect the announce message to each other around the same time. For example, the second datacenter 304b may send a copy of the announce message to the third datacenter 304c around the same time that the third datacenter 304c sends a copy of the announce message to the second datacenter 304b.

It will be appreciated that depending on network conditions, geographic and network locations, etc., the timing of when a datacenter reflects state information messages between datacenters in the VoIP system 300 is may vary. For example, if the second datacenter 304b receives the copy of the announce message from the third datacenter 304c before reflecting a copy of the announce message to the third datacenter 304c, the second datacenter 304b can determine not to send the copy of the announce message to the third datacenter 304c.

In step 410, the second datacenter 304b and the third datacenter 304c can increment and check the message count associated with the announce message. For example, as described above, a receiver 336b on the second datacenter 304b may increment the message count associated with announce message after the second datacenter 304b receives a copy of the announce message from the third datacenter 304c. Based on the message count associated with the announce message, the second datacenter 304b can determine to not reflect the announce message to the third datacenter 304c. Alternatively, the second datacenter 304b can reflect the announce message to the third datacenter 304c if the second datacenter 304b has only received the announce message from the first datacenter 304a.

In step 412, each of the datacenters 304 can add a state table entry to their respective state tables based on the contents of the announce message. For example, in step 412a, the first datacenter 304a can add a state table entry to the state table 342a based on the announce message. For instance, based on the announcement message, an updater 340a at the first datacenter 304a can add an entry to the state table 342a indicating that the network device 302 has joined a communication session with a second network device. Similarly, the second datacenter 304b and the third datacenter 304c can add corresponding entries to their respective state tables. In this manner, regardless of which of the datacenters 304 detects and processes an event, each datacenter 304 in the VoIP system 300 can maintain a current state table that includes state information corresponding to the event.

In step 414, the first datacenter 304a can detect and process an event change. For example, the first datacenter 304a can detect an event change associated with the event the first datacenter 304a previously detected in step 402. For instance, the first datacenter 304a can detect that a user participating in a communication session has placed the network device 302 on hold. Alternatively, the first datacenter 304a can detect an event change for an event unrelated to the previously detected event.

In step 416, the first datacenter 304a can sent a replace message to the second datacenter 304b and the third datacenter 304c. A replace message (e.g., a REPLACE message) can indicate to a datacenter to update, modify, and/or replace a state table entry. In some example embodiments, a replace message can include a context, a handle, and one or more data elements that relate to the context, such as a user account. For example, the context can correspond to a user account, the handle can correspond to an event corresponding to an entry in a state table at a datacenter, and the data element can correspond to an updated state table entry, such as a value. In one or more embodiments, the data element in the announce message can include a former value and a current value, as described below in additional detail in connection with FIG. 5.

In steps 418a-b, the second datacenter 304b and the third datacenter 304c can check the replace message count associated with the replace message in a similar manner as checking the announce message count described above. Also, as described above, upon receiving the replace message, the second datacenter 304b and the third datacenter 304c can initiate or increment the replace message count. Then, if the replace message count is less than or equal to one (1), where a count of one (1) indicates that a datacenter 304 has received the replace message once, the second datacenter 304b and/or third datacenter 304c can reflect the replace message to other datacenters in the VoIP system 300. Otherwise, a replace message count greater than one (1) can indicate to the datacenters 304 not to reflect the replace message.

In steps 420a-b, the second datacenter 304b and third datacenter 304c can reflect the replace message between each other based on the replace message count, as described above. Further, the second datacenter 304b and/or the third datacenter 304c can reflect the replace message to additional datacenters within the VoIP system 300 based on the replace message count. In addition, in steps 424a-b, the second datacenter 304b and the third datacenter 304c can again increment and check the replace message count, as described above, to determine whether to reflect the replace message.

In step 424, the first datacenter 304a, the second datacenter 304b, and the third datacenter 304c can update a state table entry based on the replace message. For example, if the replace message includes an updated balance for a user account, the first datacenter 304a can replace the state table entry associated with the user account balance to reflect the updated balance.

As another example, a datacenter can replace the state table entry added in conjunction with the announce message, as described above. For example, the replace message can include updated information corresponding to the communication session in which the network device 302 is participating, such as the duration of the communication session and which network device are in the communication session. To illustrate, the third datacenter 304c can replace the previously added state table entry with the state table entry included in the replace message. Alternately, the third datacenter 304c can amend or modify the previous state table entry with the state information from the replace message.

In step 426, the first datacenter 304a can detect the termination of an event. For example, the first datacenter 304a can detect that the network device 302 has ended the communication session. The first datacenter 304a can send a withdraw message to the second datacenter 304b and the third datacenter 304c, as shown in step 428.

A withdraw message (e.g., a WITHDRAW message) can indicate to a datacenter 304 to remove an entry from the datacenter's state table. In some example embodiments, a withdraw message can include a context, a handle, and one or more data elements that relate to the context. Alternatively, the withdraw message can include a minimal amount of information necessary for a datacenter to identify and remove a corresponding state table entry, such as an entry id used to identify the state table entry.

In steps 430-434, the second datacenter 304b and the third datacenter 304c can check the withdraw message count, reflect a copy of the withdraw message, and re-check the withdraw message count, in a similar manner as described above. For example, the second datacenter 304b can check the withdraw message count, reflect a copy of the withdraw message to the third datacenter 304c, and recheck the withdraw message count upon receiving a copy of the withdraw message from the third datacenter 304c, as illustrated in steps 430a, 432a, and 434a.

In step 436, the first datacenter 304a, the second datacenter 304b, and the third datacenter 304c can remove to the state table entry based on the withdraw message. For example, based on the withdraw message, the third datacenter 304c can delete the state table entry corresponding the communication session between network device 302 and other network devices. Similarly, the first datacenter 304a and the second datacenter 304b can also delete the corresponding state table entry. In this manner, each datacenter 304 in the VoIP system 300 can maintain a current state table 342 without requiring redundant event processing at each datacenter.

FIG. 5 illustrates an example data table used in system 300 of FIG. 3 in accordance with one or more embodiments disclosed herein. In particular, the table in FIG. 5 can represent eight (8) different state information messages 502 sent from the first datacenter 304a. For example, the first datacenter 304a can send each state information message 502 to the second datacenter 304b and/or the third datacenter 304c.

Each state information message 502 illustrated in the table in FIG. 5 can include content and/or information corresponding to an identifier 504, a sender 506, a message type 508, a context 510, a handle 512, a network device field 514, a former value 516, and/or a updated value 518. The type of information included in each state information message 502 can vary depending on the type of state information message 502. Further, one will appreciate that a state information message 502 can include other content and/or information.

The identifier 504 can include identifying information corresponding to a state information message 502. The identifier 504 can be a unique number, text string, timestamp, etc. As an example, the third state information message 502 (e.g., message "3") in the table in FIG. 5 has a identifier 504 of "1DC-3" while the sixth state information message 502 (e.g., message "6") has a identifier 504 of "1DC-5."

In some embodiments, a portion of the identifier 504 can indicate the origin of the state information message 502. For instance, the identifier 504 for the second state information message 502 (i.e., "1DC-2,") can indicate that the state information message 502 is the second state information message 502 (e.g., message "2") created by the first datacenter 304a (e.g., "1DC"). Using the identifying information in the identifier 504, a datacenter can determine not to reflect the received state information message back to the datacenter that originated the state information message 502. For example, when the second datacenter 304b receives the a state information message 502 from the first datacenter 304a, the second datacenter 304b prevent the state information message 502 from being reflected back to the first datacenter 304a.

In addition, a datacenter 304 can use the identifier 504 in connection with the message count function described above to determine the number of times a particular state information message has arrived at the datacenter 304. For example, a datacenter can determine the number of times the datacenter has received a state information message 502 with a particular identifier 504. Based on the message count, the datacenter can determine whether to reflect a state information message 502, as described above.

The sender 506 can indicate which datacenter sent the state information message. For example, the third datacenter 304c can receive the first state information message 502 (e.g., message "1") from the first datacenter 304a. In some instances, the originating datacenter and the sender 506 are the same datacenter. Alternatively, the originating datacenter can differ from the sender 506. For example, the sender 506 datacenter may have reflected the state information message from the originating datacenter or another datacenter.

Further, using the sender 506 information, a datacenter can prevent reflecting a copy of the state information back to the sending datacenter. For example, if the second datacenter 304b receives the fourth state information message 502 from the third datacenter 304c, the second datacenter 304b can determine to not reflect a copy of the fourth state information message 502 back to the third datacenter 304c.

As mentioned above, each state information message 502 can include a message type 508. Message types 508 can include announce messages, replace messages, and withdraw messages, as described above. One will appreciate that state information message 502 can include additional message types 508.

Each message types 508 can include a specific set of content and/or information within a state information message 502. For example, an announce message can include, or link to, a context 510, a handle 512, and an updated value 518. A datacenter that receives the announce message can use the context 510, handle 512, and updated value 518 in the announce message to add a new state table entry to its state table 342.

A replace message can include a context 510 and a handle 512. A datacenter 304 that receives the replace message can use the context 510 and handle 512 in the replace message to identify an existing state table entry in its state table 342. Further, a replace message can also include a former value 516 and an updated value 518. As described below in greater detail, the datacenter 304 can verify that the former value 516 in the replace message matches the current value found in the identified state table entry before replacing the current value in the state table entry with the updated value 518 of the replace message.

The withdraw message can include a context 510 and handle 512 that corresponds to an existing context and handle in a state table. As described above, a datacenter 304 that receives the withdraw message can use the context 510 and handle 512 in the withdraw message to identify an existing state table entry in its state table 342. Further, the withdraw message can include an indication to remove the identified state table entry. For example, a null updated value 518 in withdraw message can indicate to a datacenter 304 to remove the identified state table entry.

In some embodiments, the withdraw message can include a former value 516. In this case, a datacenter can verify that the former value 516 in the withdraw message matches the current value found in the identified state table entry before removing the identified state table entry from the state table at the datacenter.

In one or more embodiments, the state information message 502 can identify one or more corresponding network devices in a network device field 514. For example, an announce message can indicate a new communication session for the network device listed in the network device field 514. An announce message can indicate the presence of a new voicemail for the network device in the network device field 514. In addition, a replace message can indicate that the network device in the network device field 514 is being place on hold, parked, or transferred. Alternatively, the network device field 514 can be blank or null when a state table entry corresponds to a context 510 rather than to one or more network devices.

As illustrated in FIG. 5, the state information message 502 can include a context 510 and a handle 512. The context 510, for example, can be a user account corresponding to one or more users and/or one or more network devices. The handle 512 can correspond to types of state information. For example, a handles 512 can correspond to user account information, such as a user account name, user account contact information, user account billing information, user account balances; user information such as, user names, user information, user authorization levels, user passwords, user profile information; network device information such as network device availability, network device status, network device authorization levels; datacenter information such as processing capabilities, datacenter preferences, datacenter connections, datacenter statistics, communication session information such as current communication sessions, previous communication sessions; remote services information such as voicemail status, park server status; etc.

A datacenter can use the context 510 and the handle 512 to identify state information in a state table. For example, as described above, a datacenter can use the context 510 and the handle 512 to identify state tables entries in its state table 342 when updating the state table. The former value 516 in a state information message 502 can represent the value that is present in a datacenter's state table before the datacenter processes an event. The updated value 518 can represent the updated (e.g., current, latest, etc.) value in the datacenter's state table after the datacenter processes an event. An example of how a state information message can be used to update a datacenter's state table is given below.

The following examples describe of how another datacenter, such as the second datacenter 304b, can receive state information message 502, shown in FIG. 5, from the first datacenter 304a and use the state information messages 502 to update state table entries 502. To illustrate, the second datacenter 304b can receive the first state information message 502 (e.g., message "1"). For instance, a user can receive a new voicemail message. The first datacenter 304a can detect the event of receiving a new voicemail to the user's account. The first datacenter 304a can send an announce message (e.g., the first state information message 502) to the second datacenter 304b indicating a new or unread voicemail message and the second datacenter 304b can receive the state information message.

Upon receiving the first state information message 502 (e.g., message "1"), the second datacenter 304b can add a new state table entry 502 to a state table at the second datacenter 304b. For example, the second datacenter 304b can add a state table entry 502 specifying that Account-1 has a one (1) new voicemail message.

Next, the first datacenter 304a can detect that a user has received a second voicemail message. For example, the first datacenter 304a can detect and process a voicemail message for the user to indicate the number of new or unread voicemails is two (2). The first datacenter 304a can send a replace message to the second datacenter 304b indicating the state information change.

The second datacenter 304b can receive the second state information message 502 (e.g., message "2") that includes the replace message. The second state information message 502 can indicate to the second datacenter 304b to replace the number of new or unread voicemails messages to two (2). Upon receiving the second state information message 502, the second datacenter 304b can update the number of new or unread voicemail messages to two (2) in a state table at the second datacenter 304b. In addition, the second datacenter 304b can replace the former value on the state table with the former value 516 from the replace message (e.g., from 1 new or unread voicemail message to 2 new or unread voicemail messages) in the second entry (e.g., entry "2"). Additional examples, regarding state information messages associated with voicemails are given below.

In some example embodiments, the second datacenter 304b can compare the former value 516 in the replace message with the corresponding value in the state table entry at the second datacenter 304b. For example, the second datacenter 304b can compare the current value of the a state table entry (e.g., 1 new or unread voicemail message) with the former value 516 of the replace message to verify a match. By comparing and matching the current value of the previous state table entry for the same context, handle, and/or network device field, the second datacenter 304b can ensure that the state table entries connect from one state table entry to the next, with conflicts of missing entries.

The user can then access (e.g., listen, read, etc.) his or her new or unread voicemail messages. Upon which, the first datacenter 304a can detect that a user has accessed the voicemail messages. In response, the first datacenter 304a can create and send a replace message indicating that the number of new or unread voicemail messages is one (1) after the user accesses the first of the new or unread voicemail messages, and another replace message indicating that the number of new or unread voicemails is zero (0) after the user accesses the second of the new or unread voicemail messages. Alternatively, the first datacenter 304a can create and send withdraw message when there are no new or unread voicemail messages.

Upon receiving the fifth state information message 502, the second datacenter 304b can first identify the state table entry that relates to Account-3's password, or a hash of the password. Next, the second datacenter 304b can verify that the former password value 516 in the fifth state information message 502 matches the pre-updated current password value in the previous state table entry associated with Account-3's password identified by the second datacenter 304b. Upon a successful verification, the second datacenter 304b can change the current password value in the previous state table entry (associated with Account-3's password with the current password value 518 provided in the fifth state information message 502.

In some example embodiments, if a password is incorrectly verified, or in other words, the user provides an incorrect password, a datacenter can create a state information message that include information about the failed attempt. For example, upon detecting a fail password attempt, the first datacenter 304a can create and send out a state information message that include the number of failed attempts, the time of the failed attempt, the IP address of the device associated with the failed attempt, etc. In this manner, each datacenter in the system can include an up-to-date state information table that records access and security records for each user account.

State information and state tables can provide useful information to users on the VoIP system 300. For example, a user can use state information to identify which network devices are currently available, which network devices are on a call, which network devices are offline, etc., by querying a state table.

To illustrate, when a network device joins a call, the state table can add a state table entry, such as the sixth state table message 502 (e.g., message "6") that indicates that the network device is on a call. Similarly, when the network device finishes the call, the state table message 502 can update to indicate that the network device is not on a call, as shown in the seventh state table message 502 (e.g., message "7"). At any time, a user authorized for a context 510 can view the status of each network devices within the context 510.

Further, as network devices join and leave communication sessions, datacenters 304 can use announce, replace, and withdraw messages to indicate the current status of each network device within the VoIP system 300. The state table entries 502 associated with network devices participating in communication session can also provide information, such as with whom the network device is communication, the time a communication session was established, the duration of each communication session, the type of media being used in each communication session, etc.

Using the systems and methods describe herein, a datacenter can add, update, and remove any type of state information from a state tables as well as distribute state information changers to other datacenters within the VoIP system 300. Further, using the systems and methods disclosed herein, each datacenter in the VoIP system 300 can maintain similar, if not identical state tables.

To illustrate, the VoIP system 300 can easily track voicemail messages for each network device using state tables. For instance, each time a voicemail is created for a user, a datacenter can send an announce message to the other datacenters in the VoIP system 300 indicating a new voicemail. Each announce message can include a context 510, a handle 512, a network device field 514, and/or an updated value 518 corresponding to a new voicemail. For example, each announce message can specify a user to which the voicemail is directed, a user account, a network device associated with the user, the duration of the voicemail, a link to the voicemail, etc.

When the datacenter detects that a user access the voicemail (e.g., marks the voicemail as read), the datacenter can send a withdraw message to the other datacenters in the VoIP system 300. In response, each datacenter in the VoIP system can remove the corresponding state table entry from their respective state tables. In this manner, the VoIP system 300 can maintain current state information at each datacenter without requiring redundant event processing at each datacenter.

As another example, a state table can be used to indicate which network devices are parked on a park server. For example, when a user parks a network device, a datacenter can send an announce message indication the park, with corresponding information, such as the park address. If the network device has been parked for a period of time, the datacenter can send a replace message updating the status of the network device, such as the duration of the park and if the park address has changed. Then, when the network device is no longer parked, the datacenter can send a withdraw message indicating to other datacenters to remove the state table entry associated with the parked network device. In this manner, the VoIP system 300 can use state table to manage network devices and or a park server.

Figure 6:
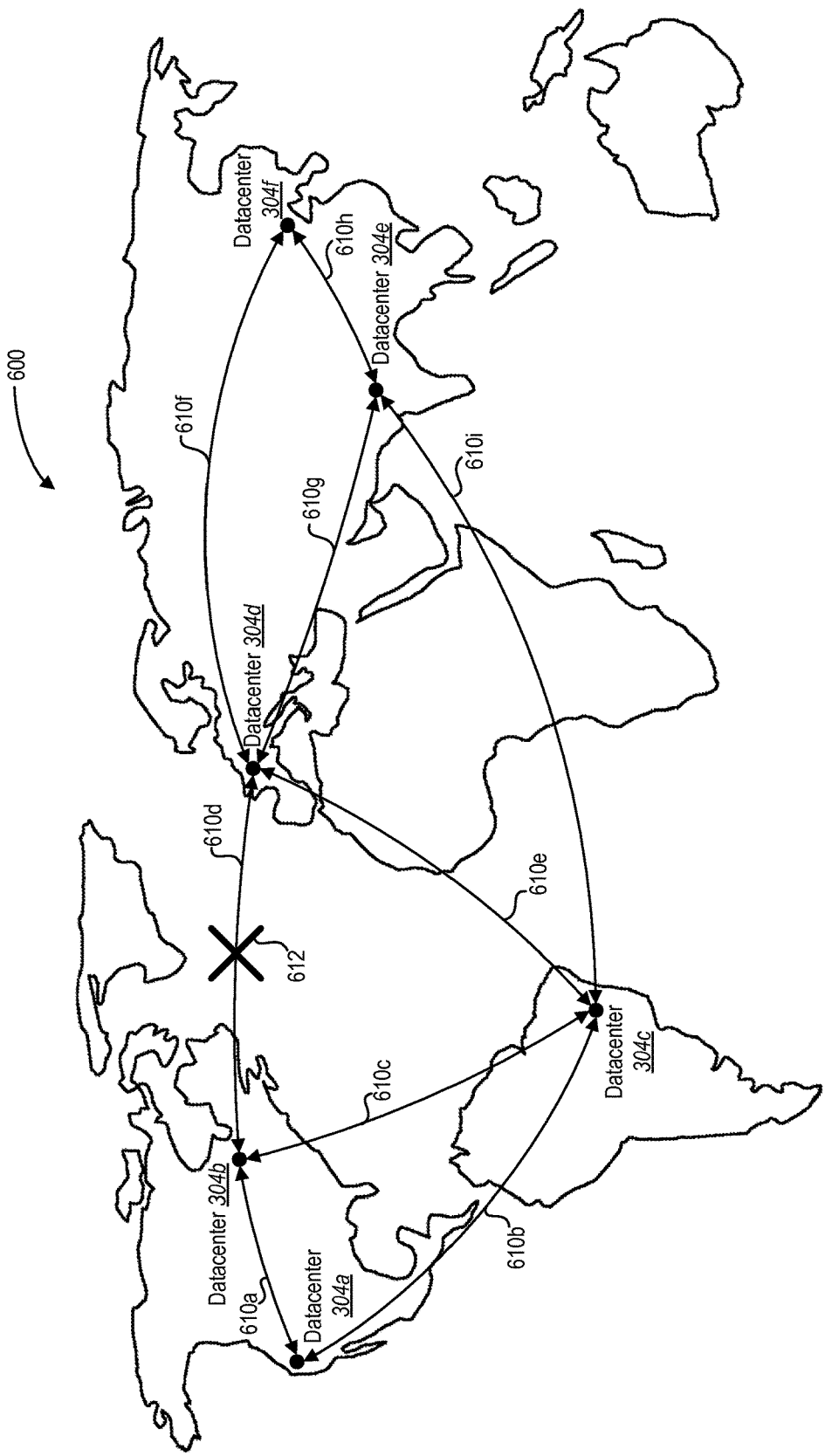
FIG. 6 illustrates a map where the network-based communication system of FIG. 3 may be utilized in accordance with one or more embodiments disclosed herein.

FIG. 6 illustrates a map schematic 600 where the network-based communication system 300 of FIG. 3 may be utilized according to principles described herein. In particular, FIG. 6 illustrates a world map 600 where the VoIP system 300 may be employed. One of skill in the art will note, that while FIG. 6 illustrates a world map 600, the embodiments, configurations, and systems disclosed herein are not limited to any particular geographic regions. For example, the VoIP system 300 may operate within and/or across a number of countries, regions, and continental boundaries. For instance, VoIP communication may utilize communication devices located in space.

As illustrated in FIG. 6, the world map 600 includes multiple datacenters 304*a-e* (or collectively referred to as "datacenters 304). The datacenters 304 may be geographically distributed throughout the world map 600. For example, FIG. 6 illustrates a datacenter 304 in the United States, Canada, Brazil, France, India, and China. One of skill in the will appreciate that the datacenters 304 are not limited to any particular geographic locations.

The VoIP system 300 can form a mesh network, as mentioned. In particular, each of the datacenters 304 can form connections 610*a-i* with two or more other datacenters. To illustrate, the United States datacenter 304*a* can connect with the Canada datacenter 304*b* (e.g., via connection 610*a*) and the Brazil datacenter 304*b* (e.g., via connection 610*b*). Similarly, the India datacenter 304*e* can connect to the Brazil datacenter 304*c* (e.g., via connection 610*i*), the France datacenter 304*d* (e.g., via connection 610*g*), and the China datacenter 304*f* (e.g., via connection 610*h*). Further, additional connections between datacenters may exist. For example, the China datacenter 304*f* may also connect with the United States datacenter 304*a*, the Brazil datacenter 304*c*, and the Canada datacenter 304*b*.

If a connection between two datacenters fails, the two datacenters may still be able to communicate with each other via the mesh network. To illustrate, the connection 610*d* between the Canada datacenter 304*b* and the France datacenters 304*d* may fail (shown as "X" 612). A connection may fail for a number of reasons, such as a power failure, physical failure (e.g., hardware failure, cable failure, satellite failure, etc.), political failure (e.g., disagreement or preventative laws between countries), or another type of failure. Even with the failure of the connection 610*d*, the Canada datacenter 304*b* may still communicate with the France datacenter 304*d* via the Brazil datacenter 304*c* using connections 610*c* and 610*e*. Alternatively, the Canada datacenter 304*b* may communicate with the France datacenter 304*d* via the Brazil datacenter 304*c* and the India datacenter 304*e* over connections 610*c* and 610*g*. Further, the Canada datacenter 304*b* and the France datacenter 304*d* may communicate via the Brazil datacenter 304*c*, the India datacenter 304*e*, and the China datacenter 304*f* using connections 610*c*, 610*g*, and 610*f*. As yet another alternative, if the United States datacenter 304*a* was directly connected (i.e., not connected through another datacenter) to the China datacenter 304*f*, the Canada datacenter 304*b* and the France datacenter 304*d* may communicate via the United States datacenter 304*a* and the China datacenter 304*f*.

Through the mesh network, the datacenters 304 may continue to communicate with each other, even when connection faults occur as described above. In particular, each of the datacenters 304 can send state information messages to the other datacenters in the VoIP system 300. Further, the datacenters 304 can send state information tables, or portions thereof, to each other, as described above. By sharing state information messages and state information tables between each other, the datacenters 304 can constantly maintain up-to-date state information tables using the above described systems and methods. Further, the datacenters 304 can resolve any conflicts that may arise due to the VoIP system 300 including multiple datacenters that are simultaneously active.

To illustrate, the connections 610*d* between the France datacenter 304*d* and the Canada datacenter 304*b* may fail, as described above. Meanwhile the France datacenter 304*d* may detect and process an event. The France datacenter 304*d* may also send out a state information message to datacenters to which the France datacenter 304*d* is still directly connected (e.g., the Brazil datacenter 304*c*, the India datacenter 304*e*, and the China datacenter 304*f*). While the France datacenter 304*d* is not connected to the Canada datacenter 304*b* when the France datacenter 304*d* sends out the state information message, the Canada datacenter 304*b* still receives the state information message through another datacenter, such as the Brazil datacenter 304 (e.g., the Brazil datacenter 304 reflects the state information message, as described above). Upon receiving the state information message, the Canada datacenter 304*b* may update its state table to match the data table at the France datacenter 304*d*. Then, upon reestablishing the connection 610*d*, the France datacenter 304*d* and the Canada datacenter 304*b* can verify that their respective state tables match. If the state tables do not match (e.g., the Canada datacenter 304*d* reconnected with the France datacenter 304*d* before receiving the state information message reflected by the Brazil datacenter 304*c* and updating its state table), the France datacenter 304*d* and the Canada datacenter 304*b* resolve the conflict, as described above. Additionally or alternatively, the France datacenter 304*d* and/or the Canada datacenter 304*b* can obtain a state table, or portions thereof, from other datacenters within the VoIP system 300 to any resolve state table conflicts, as described above.

Figure 7:
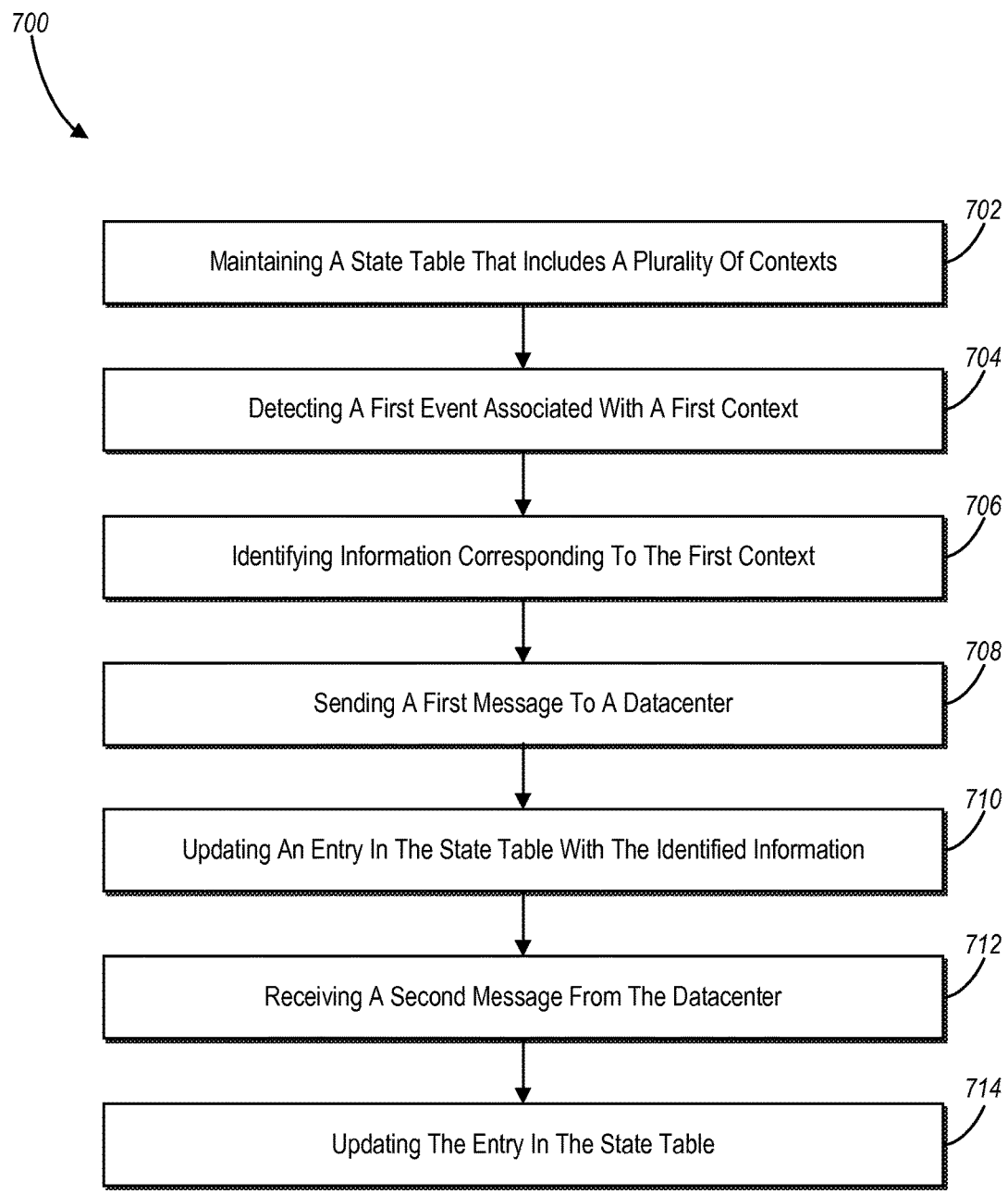
FIG. 7 illustrates a method of distributing state information between multiple datacenters within a network-based communication system in accordance with one or more embodiments disclosed herein.
Figure 8:
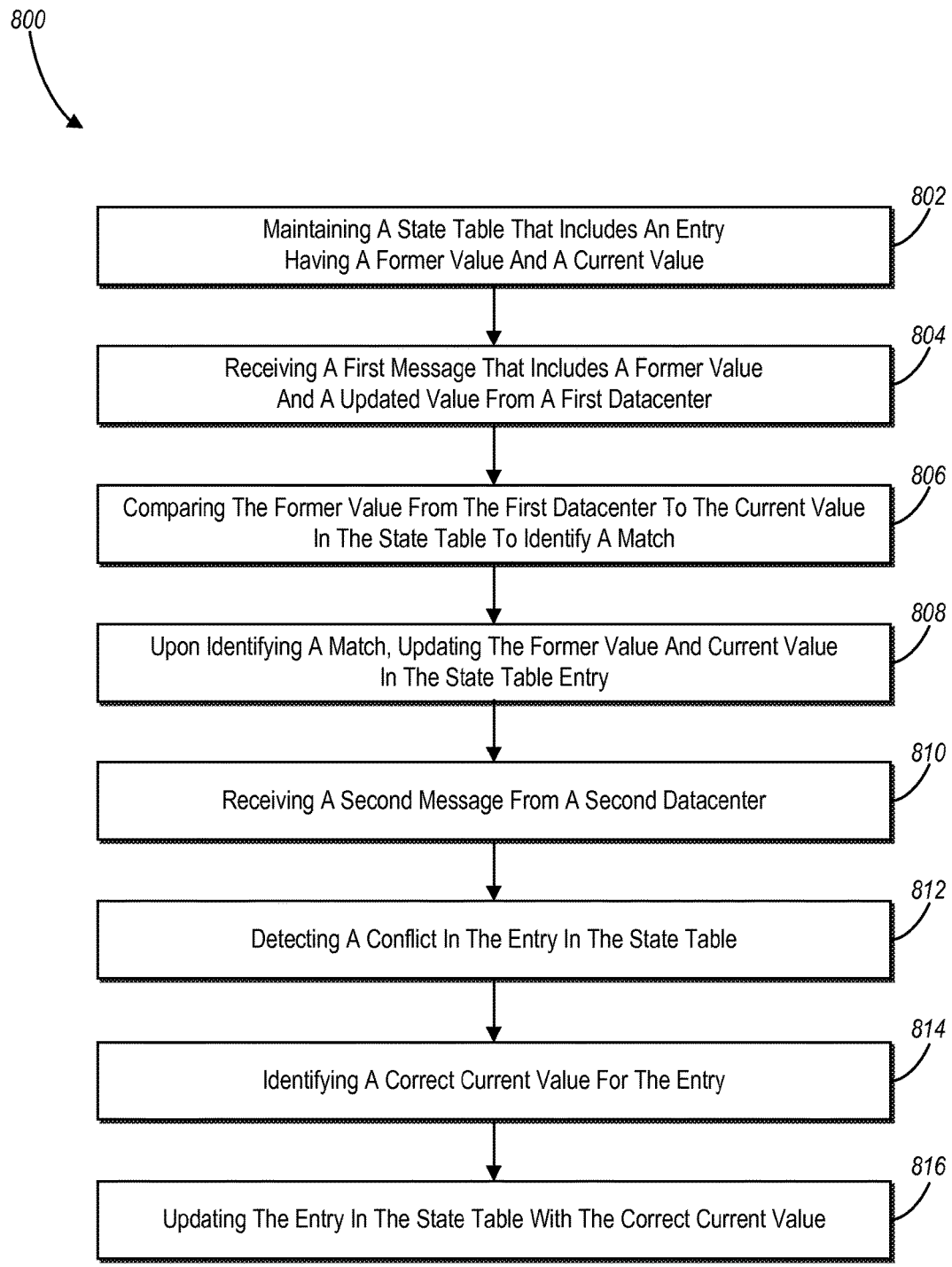
FIG. 8 illustrates another exemplary method of distributing state information between multiple datacenters within a network-based communication system in accordance with one or more embodiments disclosed herein.

FIGS. 1-6, the corresponding text, and the examples, provide a number of different systems and devices for providing a network based communication system. In addition to the foregoing, embodiments also can be described in terms of flowcharts comprising acts and steps in a method for accomplishing a particular result. For example, FIGS. 7-8 illustrate flowcharts of example methods in accordance with one or more embodiments. The methods described in relation to FIGS. 7-8 may be performed with less or more steps/acts or the steps/acts may be performed in differing orders. Additionally, the steps/acts described herein may be repeated or performed in parallel with one another or in parallel with different instances of the same or similar steps/acts. One or more of the steps shown in FIGS. 7-8 may be performed by any component or combination of components of the system 100 and/or the VoIP system 300.

FIG. 7 illustrates another method 700 of distributing state information between multiple datacenters within a network-based communication system in accordance with one or more embodiments disclosed herein. To illustrate, step 702 include maintaining a state table that includes a plurality of contexts. In particular, step 702 may include maintaining a state table including a plurality of contexts where each of the plurality of contexts associated with a plurality of handles and entries. For example, each of the datacenters 304 in the VoIP system 300 may maintain a state table, in any suitable manner as disclosed herein.

Step 704 includes detecting a first event associated with a first context. In particular, step 704 may include detecting a first event associated with a first context from the plurality of contexts. For example, an event manager 322 in a first datacenter 304*a* in the VoIP system 300 may detect a first event, in any suitable manner as disclosed herein.

Step 706 includes identifying information corresponding to the first context. In particular, step 706 may include, based on the first event, identifying a first handle corresponding to the first context and a first data element corresponding to the first context. For example, the event manager 322 may identify a handle and data element for a context from an event and/or state information message, in any suitable manner as disclosed herein.

Step 708 includes sending a first message to a datacenter. In particular, step 708 may include sending, to a datacenter, a first message that includes the first handle and the first data element. In some embodiments, the first datacenter 304*a* may send state information messages to other datacenters in the VoIP system 300, as described herein.

Step 710 includes updating an entry in the state table with the identified information. In particular, step 710 may include updating an entry associated with the first context in the state table based on the first handle and the first data element. For example, a message reflector 342 in the first datacenter 304*a* may update the state table at the first datacenter 304*a*, as described herein. Other datacenters in the VoIP system 300 may similarly update their respective state tables.

Step 712 includes receiving a second message from the datacenter. In particular, step 712 may include receiving, from the datacenter, a second message including a second handle corresponding to the first context and a second data element corresponding to the first context. For example, the first datacenter 304*a* may receive a state information message from another datacenter in the VoIP system 300, as disclosed herein.

Step 714 includes updating the entry in the state table. In particular, step 714 may include updating the entry associated with the first context in the state table based on the second handle and the second data element. For example, the first datacenter 304*a* may update the state table at the first datacenter 304*a*, as described herein.

FIG. 8 illustrates another exemplary method 800 of distributing state information between multiple datacenters within a network-based communication system in accordance with one or more embodiments disclosed herein. To illustrate, step 802 includes maintaining a state table that includes an entry having a former value and a current value. In particular, step 802 may include maintaining a state table having an entry, the entry includes an entry handle, an entry former value, and an entry current value. For example, the first datacenter 304*a* in the VoIP system 300 may maintain a state table that includes an entry, in any suitable manner as disclosed herein.

Step 804 includes receiving a first message that includes a former value and an updated value from a first datacenter. In particular, step 804 may include receiving, from a first datacenter, a first message that includes a first handle and a first data element where the first data element includes a first message former value and a first message updated value. For example, the first datacenter 304*a* may receive a state information message from another datacenter in the VoIP system 300, as disclosed herein.

Step 806 includes comparing the former value from the first datacenter to the current value in the state table to identify a match. In particular, step 806 may include comparing the entry current value to the first message former value to determine whether the entry current value matches the first message former value. For example, the first datacenter 304*a* can compare values to identify whether a current value in a state table matches a former value in a state information message, in any suitable manner disclosed herein.

Step 808 includes, upon identifying a match, updating the former value and current value in the state table entry. In particular, step 808 may include, based on determining that the entry current value and the message former value match, updating the state table by replacing the entry former value with the entry current value and replacing the entry current value with the first message updated value. For example, the first datacenter 304*a* may update the state table at the first datacenter 304*a*, as described herein.

Step 810 includes receiving a second message from a second datacenter. In particular, step 810 may include receiving, from a second datacenter, a second message that includes a second handle and a second data element where the second data element includes a send message former value and a second message updated value. For example, the first datacenter 304*a* may receive a second state information message from another datacenter in the VoIP system 300, as disclosed herein.

Step 812 includes detecting a conflict in the entry in the state table. In particular, step 812 may include detecting a conflict in the entry in the state table when the current value in the state table does not match the former value of the second data element, and when the former value in the state table matches the former value of the second data element. For example, the first datacenter 304a may detect conflicts and/or potential conflicts in the state table of the first datacenter 304a, in any suitable manner as described herein.

Step 814 includes identifying a correct current value for the entry. In particular, step 814 may include identifying a corrected current value by comparing the updated value of the first data element and the updated value of the second data element with the former value of the entity in the state table. For example, the first datacenter 304a may resolve state table entry conflicts and identify and/or determine correct entry values, in any suitable manner as disclosed herein.

Step 816 includes updating the entry in the state table with the correct current value. In particular, step 816 may include updating the current value in the state table with the corrected current value. For example, the first datacenter 304a may update the state table at the first datacenter 304a to include correct state table entry values, as described herein.

Figure 9:
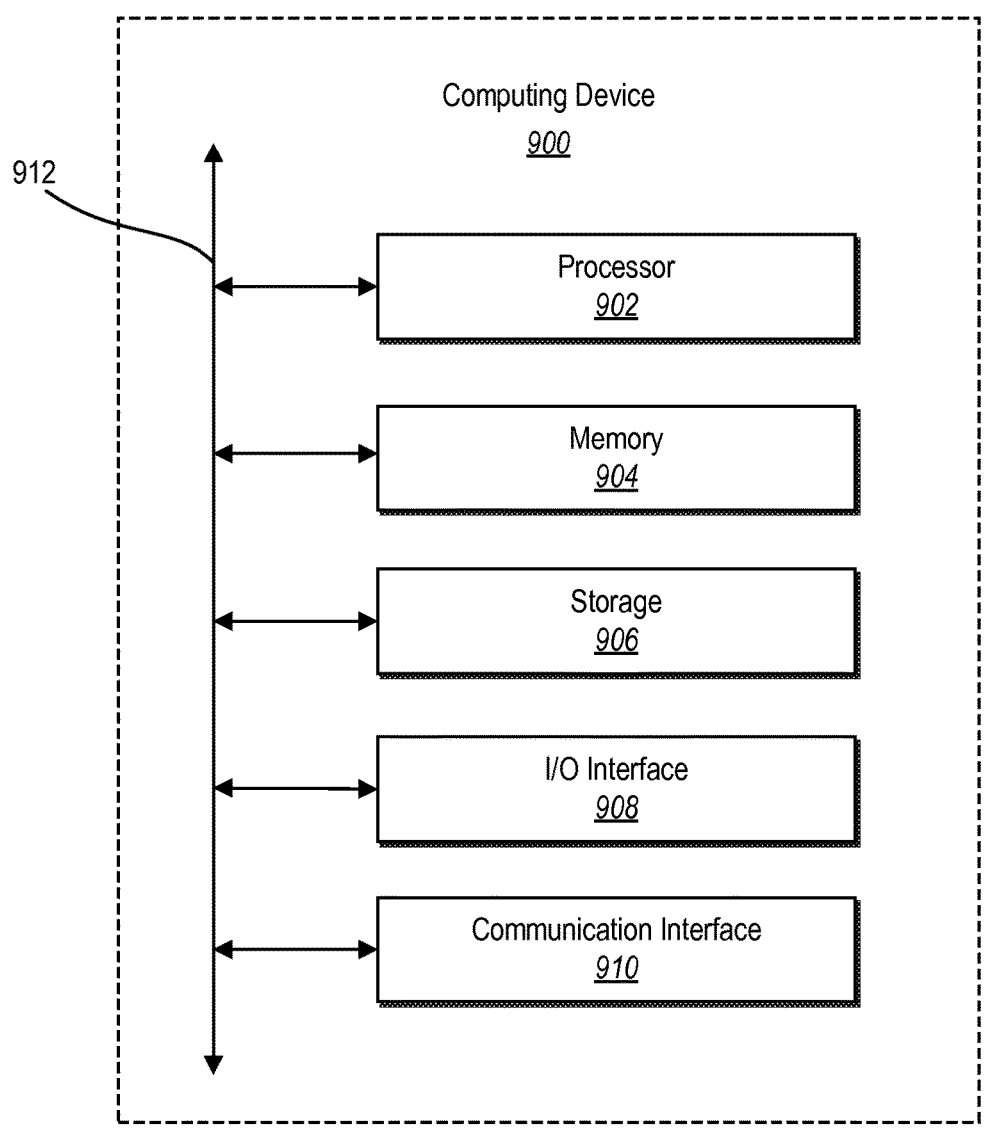
FIG. 9 illustrates a block diagram of an exemplary computing device according to the principles described herein.

FIG. 9 illustrates, in block diagram form, an exemplary computing device 900 that may be configured to perform one or more of the processes described above. One will appreciate that system 100, and/or VoIP system 300 each comprises one or more computing devices in accordance with implementations of computing device 900. As shown by FIG. 9, the computing device can comprise a processor 902, a memory 904, a storage device 906, an I/O interface 908, and a communication interface 910, which may be communicatively coupled by way of communication infrastructure 912. While an exemplary computing device 900 is shown in FIG. 9, the components illustrated in FIG. 9 are not intended to be limiting. Additional or alternative components may be used in other embodiments. Furthermore, in certain embodiments, a computing device 900 can include fewer components than those shown in FIG. 9. Components of computing device 900 shown in FIG. 9 will now be described in additional detail.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage device 906 and decode and execute them. In particular embodiments, processor 902 may include one or more internal caches for data, instructions, or addresses. As an example and not by way of limitation, processor 902 may include one or more instruction caches, one or more data caches, and one or more translation lookaside buffers ("TLBs"). Instructions in the instruction caches may be copies of instructions in memory 904 or storage 906.

Memory 904 may be used for storing data, metadata, and programs for execution by the processor(s). Memory 904 may include one or more of volatile and non-volatile memories, such as random access memory ("RAM"), read only memory ("ROM"), a solid-state disk ("SSD"), flash, phase change memory ("PCM"), or other types of data storage. Memory 904 may be internal or distributed memory.

Storage device 906 includes storage for storing data or instructions. As an example and not by way of limitation, storage device 906 can comprise a non-transitory storage medium described above. Storage device 906 may include a hard disk drive ("HDD"), a floppy disk drive, flash memory, an optical disc, a magneto-optical disc, magnetic tape, or a universal serial bus ("USB") drive or a combination of two or more of these. Storage device 906 may include removable or non-removable (or fixed) media, where appropriate. Storage device 906 may be internal or external to the computing device 900. In particular embodiments, storage device 906 is non-volatile, solid-state memory. In other embodiments, Storage device 906 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

I/O interface 908 allows a user to provide input to, receive output from, and otherwise transfer data to and receive data from computing device 900. I/O interface 908 may include a mouse, a keypad or a keyboard, a touch screen, a camera, an optical scanner, network interface, modem, other known I/O devices or a combination of such I/O interfaces. I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 908 is configured to provide graphical data to a display for presentation to a user. The graphical data may be representative of one or more graphical user interfaces and/or any other graphical content as may serve a particular implementation.

Communication interface 910 can include hardware, software, or both. In any event, communication interface 910 can provide one or more interfaces for communication (such as, for example, packet-based communication) between computing device 900 and one or more other computing devices or networks. As an example and not by way of limitation, communication interface 910 may include a network interface controller ("NIC") or network adapter for communicating with an Ethernet or other wire-based network or a wireless NIC ("WNIC") or wireless adapter for communicating with a wireless network, such as WI-FI.

Additionally or alternatively, communication interface 910 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, communication interface 910 may facilitate communications with a wireless PAN ("WPAN") (such as, for example, a BLUETOOTH WPAN), a WI-FI network, a WI-MAX network, a cellular telephone network (such as, for example, a global system for mobile communications ("GSM") network), a satellite network, a navigation network, a broadband network, a narrowband network, the Internet, a local area network, or any other networks capable of carrying data and/or communications signals between a network device 102 and one or more datacenters 104.

To illustrate, the communication interface may communicate using any communication platforms and technologies suitable for transporting data and/or communication signals, including known communication technologies, devices, media, and protocols supportive of remote data communications, examples of which include, but are not limited to, data transmission media, communications devices, transmission control protocol ("TCP"), internet protocol ("IP"), file transfer protocol ("FTP"), telnet, hypertext transfer protocol ("HTTP"), hypertext transfer protocol secure ("HTTPS"), session initiation protocol ("SIP"), simple object access protocol ("SOAP"), extensible mark-up language ("XML") and variations thereof, simple mail transfer protocol ("SMTP"), real-time transport protocol ("RTP"), user datagram protocol ("UDP"), global system for mobile communications ("GSM") technologies, enhanced data rates for GSM evolution ("EDGE") technologies, code division multiple access ("CDMA") technologies, time division multiple access ("TDMA") technologies, short message service ("SMS"), multimedia message service ("MMS"), radio frequency ("RF") signaling technologies, wireless communication technologies, in-band and out-of-band signaling technologies, and other suitable communications networks and technologies.

Communication infrastructure 912 may include hardware, software, or both that couples components of computing device 900 to each other. As an example and not by way of limitation, communication infrastructure 912 may include an accelerated graphics port ("AGP") or other graphics bus, an enhanced industry standard architecture ("EISA") bus, a front-side bus ("FSB"), a hypertransport ("HT") interconnect, an industry standard architecture ("ISA") bus, an infiniband interconnect, a low-pin-count ("LPC") bus, a memory bus, a micro channel architecture ("MCA") bus, a peripheral component interconnect ("PCI") bus, a PCI-Express ("PCIe") bus, a serial advanced technology attachment ("SATA") bus, a video electronics standards association local ("VLB") bus, an InfiniBand bus, or another suitable bus or a combination thereof.

Figure 10:
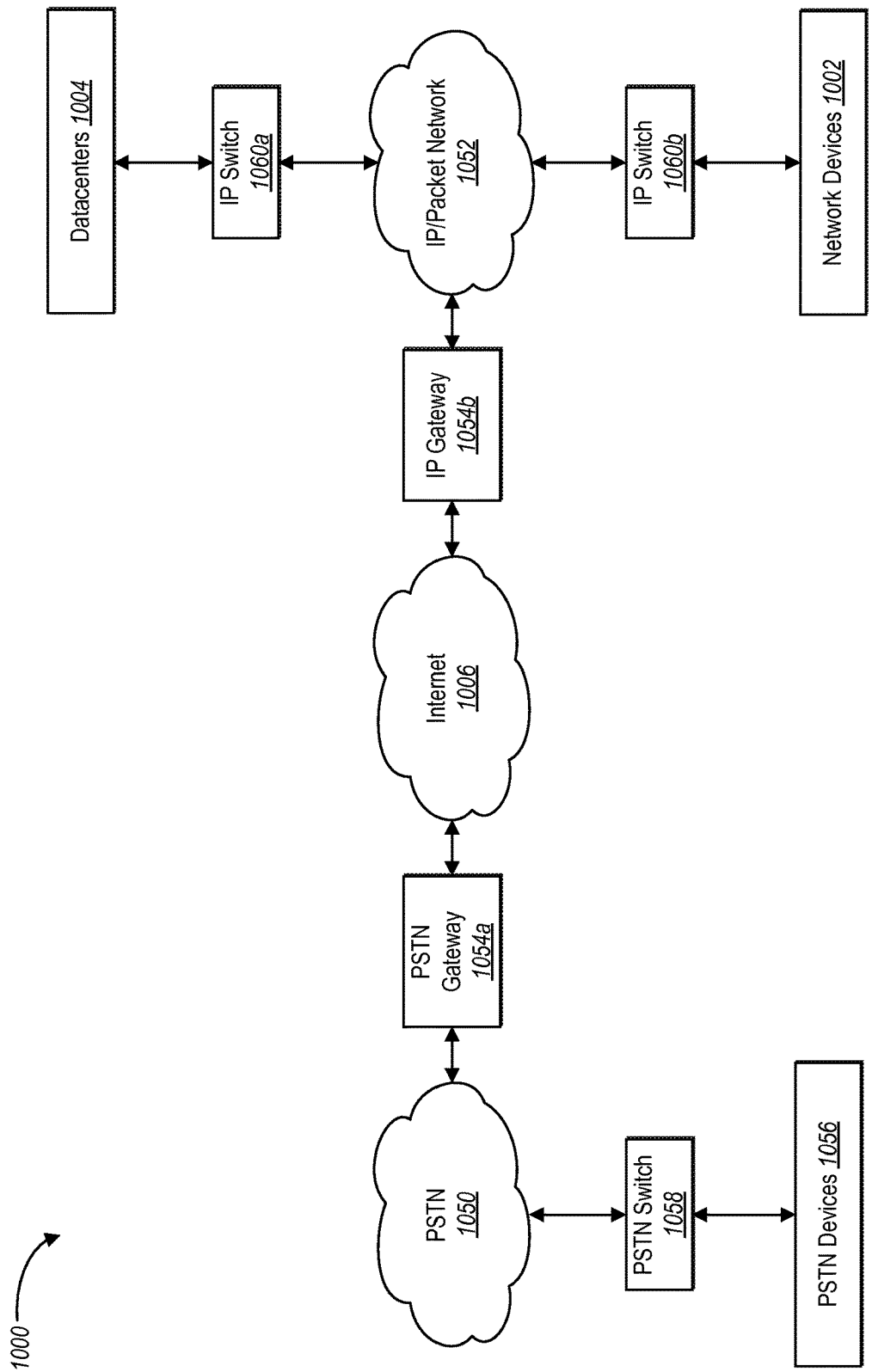
FIG. 10 illustrates an example network environment of a network-based communication system according to the principles described herein.

FIG. 10 illustrates an example network environment of a telecommunications system 1000 according to the principles described herein. In particular, the telecommunications system 1000 may facilitate both network-based communication systems as well as circuited-switched traditional communication systems. For example, the telecommunications system 1000 may allow a user calling from a traditional landline to converse with a user using a VoIP device. In addition, while FIG. 10 illustrates exemplary components and devices according to one embodiment, other embodiments may omit, add to, reorder, and/or modify any of the components and devices shown in FIG. 10.

The telecommunication system 1000 may include a PSTN 1050 and an IP/packet network 1050. The PSTN 1050 and the IP/packet network 1052 may be connected via a network, such as the Internet 1006, intranet, or over a private network. In some configurations, the PSTN 1050 and/or the IP/packet network 1052 may be connected to the Internet 1006 via a PSTN gateways 1054a or an IP gateway 1054b. For example, gateway 1054b may be a signaling gateway and/or a media gateway. For instance, the signaling gateway processes and translates bidirectional SIP signals, and the media gateway handles real-time transport protocol communications. In addition, network trunks may interconnect the PSTN 1050, the Internet 1006, and the IP/packet network 1050.

The PSTN 1050 may connect to one or more PSTN devices 1056. For example, a switch PSTN may connect the one or more PSTN devices 1056 to the PSTN 1050. PSTN devices 1056 may include a variety of devices ranging from traditional landline devices to mobile/cellular devices. In some embodiments, the PSTN can connect to a network-based communication system via a datacenter.

The PSTN 1050 may include, but is not limited to telephone lines, fiber optic cables, microwave transmission links, cellular networks, communications satellites, and undersea telephone cables. Switching centers may interconnect each of this components and networks. Further, the PSTN 1050 may be analog or digital. In addition, the PSTN 1050 may use protocols such as common channel signaling system 7 ("CCS7"). CCS7 is a set of protocols used in the PSTN 1050 to setup and tear down communications between subscribers (i.e., users).

As illustrated in FIG. 10, the telecommunications system 1000 may include an IP/packet network 1052. The IP/packet network 1052 may be part of a network-based communication system, such as a VoIP communication system. VoIP systems are generally known for transmitting voice packets between users. However, VoIP systems also handle other forms of communication, such as video, audio, photographs, multimedia, data, etc. For example, VoIP systems provide communication services for telephone calls, faxes, text messages, and voice-messages.

The IP/packet network 1052 provides communications services between users over the Internet 1006 rather than using a traditional PSTN 1050. However, VoIP systems also allow users to communicate with users using PSTN 1050. Thus, a subscriber using a network device 1002 may communicate with a subscriber using a PSTN device 1056. Furthermore, VoIP systems allow users to communicate with each other without accessing the PSTN 1050.

Embodiments disclosed herein may comprise or utilize a special purpose or general-purpose computer including computer hardware, such as, for example, one or more processors and system memory, as discussed in greater detail below. Embodiments within the scope disclosed herein also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the invention can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the invention. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

As illustrated in FIG. 10, the IP/packet network 1052 may also include network devices 1002 devices and datacenters 1004. The network devices 1002 devices and datacenters 1004 illustrated in FIG. 10 may be exemplary configurations of the network device 302 and datacenters 204 described above. For example, example of network devices 1002 include a variety of devices, such as personal computers, a tablet computer, handheld devices, mobile phones, smartphones, a personal digital assistants ("PDA"), in- or out-of-car navigation systems, and other electronic access devices. In addition, the network device 1002 may be part of an enterprise environment, such as a professional business exchange ("PBX"), a small office/home office environment, or a home/personal environment.

As briefly described above, network devices 1002 may include dedicated devices and soft devices. Dedicated devices are commonly designed and appear like a digital business telephone. Soft devices or softphones refer to software installed on a computing device. This software utilizes microphone, audio, and/or video capabilities of the computing device and provides traditional calling functionality to a user, operated via a user interface.

Datacenter 1004 may facilitate communications between network devices 1002. For example, datacenter 1004 registers devices, stores device identification and address information, tracks current communications, and logs past communications, etc., as described above. In addition, datacenters 1004 also assists network devices in provisioning, signaling, and establishing user communications via a media bridge.

In the case of multiple datacenters 1004, one datacenter 1004 may communicate with another datacenter 1004. For example, one datacenter 1004 may send gathered network device 1002 information to the other datacenter 1004. In particular, when a datacenter 1004 registers a network device 1002, that datacenter 1004 may send the address information to the other datacenters 1004 located on the IP/packet network 1052. Accordingly, each datacenter 1004 may communicate with others datacenters 1004 and assist the IP/packet network 1052 in balancing network and processing loads. Further, the datacenters 1004 may assist the IP/packet network 1052 to ensure that communication sessions between network devices 1002 do not fail by communicating with each other.

As illustrated, the network devices 1002 and the datacenters 1004 may be connected to the IP/packet network 1052 via IP switches 1060a-b. IP switches 1060a-b manage the flow of data across the IP/packet network 1052 by transmitting a received message to the device for which the message was intended. In some configurations, the IP switches 1060a-b may also perform router functions. Further, while not illustrated, one or more modems may be in electronic communication with the IP switches 1060a-b.

In addition, the IP/packet network 1052 may facilitate session control and signaling protocols to control the signaling, set-up, and teardown of communication sessions. In particular, the IP/packet network 1052 may employ SIP signaling. For example, the IP/packet network 1052 may include a SIP server that processes and directs signaling between the network devices 1002 and the IP/packet network 1052. Other protocols may also be employed. For example, the IP/packet network 1052 may adhere to protocols found in the H.225, H.323, and/or H.245 standards, as published by the International Telecommunications Union, available at the following URL-http://www.itu.int/publications.

In particular, session initiation protocol ("SIP") is a standard proposed by the Internet Engineering Task Force ("EITF") for establishing, modifying, and terminating multimedia IP sessions. Specifically, SIP is a client/server protocol in which clients issue requests and servers answer with responses. Currently, SIP defines requests or methods, including INVITE, ACK, OPTIONS, REGISTER, CANCEL, and BYE.

The INVITE request is used to ask for the presence of a contacted party in a multimedia session. The ACK method is sent to acknowledge a new connection. The OPTIONS request is used to get information about the capabilities of the server. In response to an OPTIONS request, the server returns the methods that it supports. The REGISTER method informs a server about the current location of the user. The CANCEL method terminates parallel searches. The client sends a BYE method to leave a session. For example, for a communication session between two network devices 1002, the BYE method terminates the communication session.

Once signaling is established, the IP/packet network 1052 may establish a media bridge. The media bridge caries the payload data for a communication session. The media bridge is separate for the device signaling. For example, in a videoconference, the media bride includes audio and video data for a communication session.

As described above a datacenter 1004 may facilitate a media bridge path for a network device 1002. For example, when one network device 1002 attempts the contact a second network device 1002, the datacenter 1004 may execute the signaling and also determine a media bridge between the two network devices 1002. Further, the datacenter 1004 may provide alternative media bridge paths to the network devices 1002 in the event that the primary media bridge weakens, for example, below a threshold level, or even fails.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments disclosed herein.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
    maintaining, at a first voice over internet protocol (VoIP) datacenter that facilitates setting up communication sessions between VoIP network devices, a first state table comprising a plurality of entries, wherein each entry of the plurality of entries corresponds to a service account and comprises an event type and a data element;
    detecting, using at least one processor at the first VoIP datacenter, a first event associated with a first service account and a first event type;
    processing, at the first VoIP datacenter, the first event by generating a first data element for the first event type for the first service account;
    sending, to a second VoIP datacenter that facilitates setting up communication sessions between VoIP network devices, a first message that comprises the first data element for first event type for the first service account that causes the second VoIP datacenter to update the first service account and the first event type in a second state table at the second VoIP datacenter with the first data element without the second VoIP datacenter processing the first event;
    updating, using the at least one processor at the first VoIP datacenter, an entry associated with the first service account and the first event type in the first state table based on the first data element;
    receiving, from the second VoIP datacenter based on the second VoIP datacenter generating the second data element by processing a second event associated with the first service account and the first event type, a second message associated with the first service account comprising the first event type and a second data element;
    incrementing a message count associated with the second message upon receiving the second message from the VoIP second datacenter;
    updating, at the first VoIP datacenter and without processing the second event, the entry associated with the first service account and the first event type in the first state table with the second data element; and
    incrementing the message count associated with the second message upon receiving a copy of the second message from a third VoIP datacenter.

2. The method of claim 1, wherein updating the entry in the first state table for the first service account and the first event type based on the first data element comprises adding the entry associated with the first service account to the first state table, the added entry having the first data element for the first event type.

3. The method of claim 2, wherein updating the entry in the first state table for the first service account and the first event type based on the second data element comprises removing the entry associated with the first service account and the first event type from the first state table.

4. The method of claim 1, wherein the first message is configured to update an entry at the second VoIP datacenter associated with the first service account and the first event type within the second state table.

5. The method of claim 1, wherein the first message is one of an announce message, a replace message, and a withdraw message.

6. The method of claim 1, further comprising:
sending the second message to a third VoIP datacenter; and
receiving a copy of the second message from the third VoIP datacenter.

7. The method of claim 6, wherein the second message is sent to the third VoIP datacenter based on the message count associated with the second message being below a threshold count.

8. The method of claim 1, wherein the second data element comprises a former value and an updated value.

9. The method of claim 8, further comprising determining whether the former value of the second message matches a current value of the entry associated with the first service account and first event type in the first state table.

10. The method of claim 9, wherein updating the entry in the first state table for the first service account and the first event type based on the second data element comprises replacing the current value of the entry associated with the first service account and the first event type with the updated value of the second message.

11. A system comprising:
at least one processor; and
at least one non-transitory computer readable storage medium storing instructions thereon that, when executed by the at least one processor, cause the system to:
maintain, at a first voice over internet protocol (VoIP) datacenter that facilitates setting up communication sessions between VoIP network devices, a first state table comprising a plurality of entries, wherein each entry of the plurality of entries corresponds to a service account and comprises an event type and a data element;
detect, at the first VoIP datacenter, a first event associated with a first service account and a first event type;
process, at the first VoIP datacenter, the first event by generating a first data element for the first event type for the first service account;
send, to a second VoIP datacenter that facilitates setting up communication sessions between VoIP network devices, a first message that comprises the first data element for first event type for the first service account that causes the second VoIP datacenter to update the first service account and the first event type in a second state table at the second VoIP datacenter with the first data element without the second VoIP datacenter processing the first event;
update, at the first VoIP datacenter, an entry associated with the first service account and the first event type in the first state table based on the first data element;
receive, from the second VoIP datacenter, a second message associated with the first service account comprising the first event type and a second data element based on the second VoIP datacenter generating the second data element by processing a second event associated with the first service account and the first event type;
increment a message count associated with the second message upon receiving the second message from the VoIP second datacenter;
update, at the first VoIP datacenter and without processing the second event, the entry associated with the first service account and the first event type in the first state table with the second data element; and
increment the message count associated with the second message upon receiving a copy of the second message from a third VoIP datacenter.

12. The system of claim 11, further comprising instructions that cause the system to:
send the second message to a third VoIP datacenter; and
receive a copy of the second message from the third VoIP datacenter.

13. The system of claim 12, wherein the second message is sent to the third VoIP datacenter based on the message count associated with the second message being below a threshold count.

14. The system of claim 11, updating the entry in the first state table for the first service account and the first event type based on the first data element comprises adding the entry associated with the first service account to the first state table, the added entry having the first data element for the first event type.

15. The system of claim 11, wherein the first message is one of an announce message, a replace message, and a withdraw message.

16. A non-transitory computer readable medium storing instructions that, when executed by at least one processor, cause a computer system to:
maintain, at a first voice over internet protocol (VoIP) datacenter that sets up direct media bridges between VoIP network devices to facilitate communication sessions, a first state table comprising a plurality of entries, wherein each entry of the plurality of entries corresponds to a service account and comprises an event type and a data element;
detect, using at least one processor at the first VoIP datacenter, a first event associated with a first service account and a first event type, wherein the first event occurs outside of the first VoIP datacenter;
process, at the first VoIP datacenter, the first event by generating a first data element for the first event type for the first service account;
send, to a second VoIP datacenter that sets up direct media bridges between VoIP network devices to facilitate communication sessions, a first message that comprises the first data element for first event type for the first service account that causes the second VoIP datacenter to update the first service account and the first event type in a second state table at the second VoIP datacenter with the first data element without the second VoIP datacenter processing the first event;
update, using the at least one processor at a first VoIP datacenter, an entry associated with the first service account and the first event type in the first state table based on the first data element;
receive, from the second VoIP datacenter, a second message associated with the first service account comprising the first event type and a second data element based on the second VoIP datacenter generating the second data element by processing a second event associated with the first service account and the first event type;
increment a message count associated with the second message upon receiving the second message from the VoIP second datacenter;
update, at a first VoIP datacenter and without processing the second event, the entry associated with the first service account and the first event type in the first state table with the second data element; and increment the message count associated with the second message upon receiving a copy of the second message from a third VoIP datacenter.

17. The non-transitory computer readable medium of claim 16, wherein updating the entry in the first state table for the first service account and the first event type based on the first data element comprises adding the entry associated with the first service account to the first state table, the added entry having the first data element for the first event type.

18. The non-transitory computer readable medium of claim 17, wherein updating the entry in the first state table for the first service account and the first event type based on the second data element comprises removing the entry associated with the first service account and the first event type from the first state table.

19. The non-transitory computer readable medium of claim 16, wherein the first message is configured to update an entry at the second VoIP datacenter associated with the first service account and the first event type within the second state table.

20. The non-transitory computer readable medium method of claim 16, wherein the first message is one of an announce message, a replace message, and a withdraw message.

* * * * *